(12) United States Patent
Hou et al.

(10) Patent No.: US 12,238,735 B2
(45) Date of Patent: Feb. 25, 2025

(54) TARGET SYSTEM INFORMATION SCHEDULING METHOD AND APPARATUS

(71) Applicant: HUAWEI TECHNOLOGIES CO., LTD., Shenzhen (CN)

(72) Inventors: Hailong Hou, Beijing (CN); Chaojun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 496 days.

(21) Appl. No.: 17/670,897

(22) Filed: Feb. 14, 2022

(65) Prior Publication Data

US 2022/0174717 A1    Jun. 2, 2022

Related U.S. Application Data

(63) Continuation of application No. PCT/CN2020/109317, filed on Aug. 14, 2020.

(30) Foreign Application Priority Data

Aug. 16, 2019   (CN) .......................... 201910760567.1

(51) Int. Cl.
*H04W 72/23* (2023.01)

(52) U.S. Cl.
CPC .................................. *H04W 72/23* (2023.01)

(58) Field of Classification Search
CPC .................................................... H04W 72/23
See application file for complete search history.

(56) References Cited

U.S. PATENT DOCUMENTS

| | | |
|---|---|---|
| 2018/0124744 A1* | 5/2018 | Xue ...................... H04W 72/30 |
| 2018/0279310 A1 | 9/2018 | Chen et al. |
| 2019/0029003 A1 | 1/2019 | Takeda et al. |

(Continued)

FOREIGN PATENT DOCUMENTS

| | | |
|---|---|---|
| CN | 102958133 A | 3/2013 |
| CN | 103716841 A | 4/2014 |

(Continued)

OTHER PUBLICATIONS

Extended European Search Report issued in corresponding European Application No. 20855241.4, dated Sep. 23, 2022, pp. 1-9.

(Continued)

*Primary Examiner* — Ricky Q Ngo
*Assistant Examiner* — Stephen N Steiner
(74) *Attorney, Agent, or Firm* — HAUPTMAN HAM, LLP

(57) ABSTRACT

This application provides a communication method and apparatus, applicable to the communication field, and in particular, to scheduling terminal devices corresponding to different bandwidth sizes or different capabilities. The method includes: A terminal apparatus receives first indication information from a network apparatus. The terminal apparatus receives target system information and/or target downlink control information from the network apparatus on a target frequency domain resource, where a bandwidth size of the target frequency domain resource is less than or equal to a bandwidth size supported by the terminal apparatus, and the target downlink control information is used to schedule the target system information.

20 Claims, 6 Drawing Sheets

(56) References Cited

U.S. PATENT DOCUMENTS

2019/0150110 A1* 5/2019 Ko .................... H04W 56/00
                                                    370/350
2019/0394776 A1* 12/2019 Lee .................... H04W 16/14

FOREIGN PATENT DOCUMENTS

| CN | 103959682 A | 7/2014 |
| CN | 109392173 A | 2/2019 |
| CN | 109937598 A | 6/2019 |

OTHER PUBLICATIONS

3GPP TS 38.213 V15.6.0 (Jun. 2019), 3rd Generation Partnership Project; Technical Specification Group Radio Access Network; NR; Physical layer procedures for control (Release 15), 107 pages.
3GPP TS 38.300 V15.6.0 (Jun. 2019), 3rd Generation Partnership Project; Technical Specification Group Radio Access Network; NR; NR and NG-RAN Overall Description; Stage 2 (Release 15), 99 pages.
Chinese Office Action issued in corresponding Chinese Application No. 201910760567.1, dated Aug. 5, 2021, pp. 1-11.
International Search Report issued in corresponding International Application No. PCT/CN2020/109317, dated Nov. 10, 2020, pp. 1-9.

* cited by examiner

TARGET SYSTEM INFORMATION SCHEDULING METHOD AND APPARATUS

CROSS-REFERENCE TO RELATED APPLICATIONS

This application is a continuation of International Application No. PCT/CN2020/109317, filed on Aug. 14, 2020, which claims priority to Chinese Patent Application No. 201910760567.1, filed on Aug. 16, 2019. The disclosures of the aforementioned applications are hereby incorporated by reference in their entireties.

TECHNICAL FIELD

This application relates to the field of communication technologies, and more specifically, to a communication method and apparatus.

BACKGROUND

With diversification of application scenarios, capabilities of different terminal apparatuses used in different application scenarios may be different. For example, bandwidth capabilities of some terminal apparatuses are limited to a specified value, for example, 5 MHz or 10 MHz. For example, 5 MHz is used. A terminal apparatus whose bandwidth capability is limited to 5 MHz cannot perform signal measurement on a frequency band whose bandwidth is greater than 5 MHz and receive information sent by another terminal apparatus or a network apparatus.

However, current communication technologies between network apparatuses and terminal apparatuses are not applicable to the terminal apparatus whose bandwidth capability is limited. For example, a bandwidth occupied by some information sent by the network apparatus to the terminal apparatus may be greater than a bandwidth capability of a narrowband terminal apparatus. In this case, the narrowband terminal apparatus cannot receive the information sent by the network apparatus.

Therefore, how to avoid the case in which the narrowband terminal apparatus cannot obtain the information sent by the network apparatus is a problem to be urgently resolved.

SUMMARY

This application provides a communication method and apparatus, so that a terminal apparatus can successfully receive information sent by a network apparatus.

According to a first aspect, an embodiment of this application provides a communication method. The method includes: A terminal apparatus receives first indication information from a network apparatus, where the first indication information is carried on a first physical broadcast channel PBCH, the first indication information indicates a first frequency domain resource, the first frequency domain resource is used for transmission of first downlink control information, and the first downlink control information is used to schedule first system information. The terminal apparatus receives target system information and/or target downlink control information from the network apparatus on a target frequency domain resource, where a bandwidth size of the target frequency domain resource is less than or equal to a bandwidth size supported by the terminal apparatus, and the target downlink control information is used to schedule the target system information. Based on the foregoing technical solution, the network apparatus may configure different downlink control information and/or corresponding system information for terminal apparatuses with different capabilities (namely, terminal apparatuses with different supported bandwidths). In this way, the terminal apparatuses with different capabilities can successfully receive the downlink control information and/or the system information sent by the network apparatus. Alternatively, the network apparatus may configure different downlink control information and/or system information for terminal apparatuses with a same capability, and send corresponding downlink control information and/or system information to different terminal apparatuses on different frequency domain resources. In this way, interference between the terminal apparatuses with the same capability can be avoided, and a success rate of receiving the downlink control information and/or the system information by the terminal apparatuses with the same capability can be improved.

In a possible design, a bandwidth size of the first frequency domain resource is greater than the bandwidth size supported by the terminal apparatus, and the target frequency domain resource is a second frequency domain resource; and that the terminal apparatus receives target system information and/or target downlink control information from the network apparatus on a target frequency domain resource includes: The terminal apparatus receives second system information and/or second downlink control information from the network apparatus on the second frequency domain resource, where the second downlink control information is used to schedule the second system information. The second frequency domain resource is different from the first frequency domain resource. Based on the foregoing technical solution, the terminal apparatus may receive system information and/or downlink control information satisfying a bandwidth capability of the terminal apparatus.

In a possible design, a bandwidth size of the first frequency domain resource is less than or equal to the bandwidth size supported by the terminal apparatus, and the target frequency domain resource is the first frequency domain resource; and that the terminal apparatus receives target system information and/or target downlink control information from the network apparatus on a target frequency domain resource includes: The terminal apparatus receives the first downlink control information and/or the first system information from the network apparatus on the first frequency domain resource. Based on the foregoing technical solution, the terminal apparatus may receive system information and/or downlink control information satisfying a bandwidth capability of the terminal apparatus.

In a possible design, the first frequency domain resource is the same as a frequency domain resource of a first initial active downlink bandwidth part BWP; and/or the second frequency domain resource is the same as a frequency domain resource of a second initial active downlink BWP.

In a possible design, the method further includes: The terminal apparatus receives second indication information from the network apparatus, where the second indication information is carried on a second PBCH, and the second indication information is used to indicate the second frequency domain resource. In the foregoing technical solution, the network apparatus may directly send, to the terminal apparatus, the second frequency domain resource used to send the second downlink control information. In this way, the terminal apparatus does not need to independently determine the second frequency domain resource. This reduces operation overheads of the terminal apparatus. In addition, based on the foregoing technical solution, in addition to carrying the second indication information, the second PBCH may further carry other information.

In a possible design, the second frequency domain resource is predefined or configured; or the second frequency domain resource is one of a plurality of frequency domain resources, and the plurality of frequency domain resources are predefined or configured. In the foregoing technical solution, the terminal apparatus may independently determine the second frequency domain resource. In this way, the network apparatus does not need to indicate the used second frequency domain resource. Therefore, signaling overheads can be reduced, and a case in which the second downlink control information cannot be received in time because the second frequency domain resource cannot be correctly received can also be avoided.

In a possible design, the first PBCH is located in a synchronization broadcast channel block SSB, and the SSB further carries a primary synchronization signal PSS and a secondary synchronization signal SSS, where a time domain resource of the second PBCH is the same as a time domain resource of the PSS, and a frequency domain resource of the second PBCH is a frequency domain resource subset of the SSB and does not overlap a frequency domain resource of the PSS. In the foregoing technical solution, a time-frequency resource used for transmission of the SSB of the first PBCH is multiplexed as a time-frequency resource used to carry the second PBCH of the second indication information. In this way, time-frequency resources can be saved.

In a possible design, the first PBCH is located in an SSB, and the SSB further carries a PSS and an SSS, where a time domain resource of the second PBCH is different from a time domain resource of the SSB, and a frequency domain resource of the second PBCH is the same as a frequency domain resource of the SSB; or a time domain resource of the second PBCH is different from a time domain resource of the SSB, and a frequency domain resource of the second PBCH is a frequency domain resource subset of the SSB. In this way, the terminal apparatus can conveniently receive information carried on the second PBCH.

In a possible design, a transmission periodicity of the second PBCH is the same as a transmission periodicity of the SSB, and the time domain resource of the second PBCH and the time domain resource of the SSB are located in a same time unit. In the foregoing technical solution, because the time domain resource of the second PBCH and the time domain resource of the SSB have same periodicities and are in the same time unit (for example, the time unit may be a half frame), the terminal apparatus can conveniently receive the information carried on the second PBCH.

In a possible design, the first indication information is indication information of a control resource set for a first physical downlink control channel PDCCH common search space set, and the control resource set for the first PDCCH common search space set is used to monitor the first downlink control information; and the second indication information is indication information of a control resource set for a second PDCCH common search space set, and the control resource set for the second PDCCH common search space set is used to monitor the second downlink control information.

According to a second aspect, an embodiment of this application provides a communication method. The method includes: A network apparatus sends first indication information, where the first indication information is carried on a first physical broadcast channel PBCH, the first indication information indicates a first frequency domain resource, the first frequency domain resource is used for transmission of first downlink control information, and the first downlink control information is used to schedule first system information. The network apparatus sends the first downlink control information on the first frequency domain resource. The network apparatus sends second downlink control information and/or second system information on a second frequency domain resource, where the first frequency domain resource is different from the second frequency domain resource. Based on the foregoing technical solution, the network apparatus may configure different downlink control information and/or corresponding system information for the terminal apparatus with different capabilities (namely, the terminal apparatuses with different supported bandwidths). In this way, the terminal apparatuses with different capabilities can successfully receive the downlink control information and/or the system information sent by the network apparatus. Alternatively, the network apparatus may configure different downlink control information and/or system information for terminal apparatuses with a same capability, and send corresponding downlink control information and/or system information to different terminal apparatuses on different frequency domain resources. In this way, interference between the terminal apparatuses with the same capability can be avoided, and a success rate of receiving the downlink control information and/or the system information by the terminal apparatuses with the same capability can be improved.

In a possible design, the first frequency domain resource is the same as a frequency domain resource of a first initial active downlink bandwidth part BWP; and/or the second frequency domain resource is the same as a frequency domain resource of a second initial active downlink BWP. Based on the foregoing technical solution, the network apparatus may alternatively configure different initial active downlink BWPs for terminal apparatuses with different capabilities.

In a possible design, the method further includes: The network apparatus sends second indication information, where the second indication information is carried on a second PBCH, and the second indication information is used to indicate the second frequency domain resource. In this way, the terminal apparatus does not need to independently determine the second frequency domain resource. This reduces operation overheads of the terminal apparatus.

In a possible design, the second frequency domain resource is predefined or configured; or the second frequency domain resource is one of a plurality of frequency domain resources, and the plurality of frequency domain resources are predefined or configured. In the foregoing technical solution, the terminal apparatus may independently determine the second frequency domain resource. In this way, the network apparatus does not need to indicate the used second frequency domain resource. Therefore, signaling overheads can be reduced, and a case in which the second downlink control information cannot be received in time because the second frequency domain resource cannot be correctly received can also be avoided.

In a possible design, the first PBCH is located in a synchronization broadcast channel block SSB, and the SSB further carries a primary synchronization signal PSS and a secondary synchronization signal SSS, where a time domain resource of the second PBCH is the same as a time domain resource of the PSS, and a frequency domain resource of the second PBCH is a frequency domain resource subset of the SSB and does not overlap a frequency domain resource of the PSS. In the foregoing technical solution, a time-frequency resource used for transmission of the SSB of the first PBCH is multiplexed as a time-frequency resource used to carry the second PBCH of the second indication information. In this way, time-frequency resources can be saved.

In a possible design, the first PBCH is located in an SSB, and the SSB further carries a PSS and an SSS, where a time domain resource of the second PBCH is different from a time domain resource of the SSB, and a frequency domain resource of the second PBCH is the same as a frequency domain resource of the SSB; or a time domain resource of the second PBCH is different from a time domain resource of the SSB, and a frequency domain resource of the second PBCH is a frequency domain resource subset of the SSB. In this way, the terminal device can conveniently receive information carried on the second PBCH.

In a possible design, a transmission periodicity of the second PBCH is the same as a transmission periodicity of the SSB, and the time domain resource of the second PBCH and the time domain resource of the SSB are located in a same time unit. In the foregoing technical solution, because the time domain resource of the second PBCH and the time domain resource of the SSB have same periodicities and are in the same time unit, the terminal device can conveniently receive the information carried on the second PBCH.

In a possible design, the first indication information is indication information of a control resource set for a first physical downlink control channel PDCCH common search space set, and the control resource set for the first PDCCH common search space set is used to monitor the first downlink control information; and the second indication information is indication information of a control resource set for a second PDCCH common search space set, and the control resource set for the second PDCCH common search space set is used to monitor the second downlink control information.

According to a third aspect, an embodiment of this application provides an apparatus. The apparatus includes: a receiving unit, configured to receive first indication information from a network apparatus, where the first indication information is carried on a first physical broadcast channel PBCH, the first indication information indicates a first frequency domain resource, the first frequency domain resource is used for transmission of first downlink control information, and the first downlink control information is used to schedule first system information, where the receiving unit is further configured to receive target system information and/or target downlink control information from the network apparatus on a target frequency domain resource, where a bandwidth of the target frequency domain resource is less than or equal to a bandwidth size supported by the terminal apparatus, and the target downlink control information is used to schedule the target system information; and a processing unit, configured to process the target system information and/or the target downlink control information received by the receiving unit.

The apparatus may be a communication apparatus, for example, a terminal apparatus. The terminal apparatus may alternatively be a terminal device, or may be a component (for example, a chip or a circuit) that may be used in the terminal device.

In a possible design, a bandwidth size of the first frequency domain resource is greater than the bandwidth size supported by the terminal apparatus, the target frequency domain resource is a second frequency domain resource, and the second frequency domain resource is different from the first frequency domain resource; and the receiving unit is configured to receive second system information and/or second downlink control information from the network apparatus on the second frequency domain resource, where the second downlink control information is used to schedule the second system information.

In a possible design, a bandwidth size of the first frequency domain resource is less than or equal to the bandwidth size supported by the terminal apparatus, and the target frequency domain resource is the first frequency domain resource; and the receiving unit is configured to receive, on the first frequency domain resource, the first downlink control information and/or the first system information sent by the network apparatus.

In a possible design, the first frequency domain resource is the same as a frequency domain resource of a first initial active downlink bandwidth part BWP; and/or the second frequency domain resource is the same as a frequency domain resource of a second initial active downlink BWP.

In a possible design, the receiving unit is further configured to receive second indication information from the network apparatus, where the second indication information is carried on a second PBCH, and the second indication information is used to indicate the second frequency domain resource.

In a possible design, the second frequency domain resource is predefined or configured; or the second frequency domain resource is one of a plurality of frequency domain resources, and the plurality of frequency domain resources are predefined or configured.

In a possible design, the first PBCH is located in a synchronization broadcast channel block SSB, and the SSB further carries a primary synchronization signal PSS and a secondary synchronization signal SSS, where a time domain resource of the second PBCH is the same as a time domain resource of the PSS, and a frequency domain resource of the second PBCH is a frequency domain resource subset of the SSB and does not overlap a frequency domain resource of the PSS.

In a possible design, the first PBCH is located in an SSB, and the SSB further carries a PSS and an SSS, where a time domain resource of the second PBCH is different from a time domain resource of the SSB, and a frequency domain resource of the second PBCH is the same as a frequency domain resource of the SSB; or a time domain resource of the second PBCH is different from a time domain resource of the SSB, and a frequency domain resource of the second PBCH is a frequency domain resource subset of the SSB.

In a possible design, a transmission periodicity of the second PBCH is the same as a transmission periodicity of the SSB, and the time domain resource of the second PBCH and the time domain resource of the SSB are located in a same time unit.

In a possible design, the first indication information is indication information of a control resource set for a first physical downlink control channel PDCCH common search space set, and the control resource set for the first PDCCH common search space set is used to monitor the first downlink control information; and the second indication information is indication information of a control resource set for a second PDCCH common search space set, and the control resource set for the second PDCCH common search space set is used to monitor the second downlink control information.

According to a fourth aspect, an embodiment of this application provides an apparatus. The apparatus includes: a processing unit, configured to determine first indication information; and a sending unit, configured to send first indication information, where the first indication information is carried on a first physical broadcast channel PBCH, the first indication information indicates a first frequency domain resource, the first frequency domain resource is used for transmission of first downlink control information, and the first downlink control information is used to schedule first system information, where the sending unit is further configured to send the first downlink control information on the first frequency domain resource; and the sending unit is further configured to send second downlink control information and/or second system information on a second frequency domain resource, where the first frequency domain resource is different from the second frequency domain resource.

The apparatus may be a communication apparatus, for example, a network apparatus. The network apparatus may alternatively be a network device, or may be a component (for example, a chip or a circuit) that may be used in the network device.

In a possible design, the first frequency domain resource is the same as a frequency domain resource of a first initial active downlink bandwidth part BWP; and/or the second frequency domain resource is the same as a frequency domain resource of a second initial active downlink BWP.

In a possible design, the sending unit is further configured to send second indication information, where the second indication information is carried on a second PBCH, and the second indication information is used to indicate the second frequency domain resource.

In a possible design, the second frequency domain resource is predefined or configured; or the second frequency domain resource is one of a plurality of frequency domain resources, and the plurality of frequency domain resources are predefined or configured.

In a possible design, the first PBCH is located in a synchronization broadcast channel block SSB, and the SSB further carries a primary synchronization signal PSS and a secondary synchronization signal SSS, where a time domain resource of the second PBCH is the same as a time domain resource of the PSS, and a frequency domain resource of the second PBCH is a frequency domain resource subset of the SSB and does not overlap a frequency domain resource of the PSS.

In a possible design, the first PBCH is located in an SSB, and the SSB further carries a PSS and an SSS, where a time domain resource of the second PBCH is different from a time domain resource of the SSB, and a frequency domain resource of the second PBCH is the same as a frequency domain resource of the SSB; or a time domain resource of the second PBCH is different from a time domain resource of the SSB, and a frequency domain resource of the second PBCH is a frequency domain resource subset of the SSB.

In a possible design, a transmission periodicity of the second PBCH is the same as a transmission periodicity of the SSB, and the time domain resource of the second PBCH and the time domain resource of the SSB are located in a same time unit.

In a possible design, the first indication information is indication information of a control resource set for a first physical downlink control channel PDCCH common search space set, and the control resource set for the first PDCCH common search space set is used to monitor the first downlink control information; and the second indication information is indication information of a control resource set for a second PDCCH common search space set, and the control resource set for the second PDCCH common search space set is used to monitor the second downlink control information.

According to a fifth aspect, an embodiment of this application provides a computer-readable storage medium. The computer-readable storage medium stores instructions used to implement the method according to any one of the first aspect or the possible implementations of the first aspect.

According to a sixth aspect, an embodiment of this application provides a computer-readable storage medium. The computer-readable storage medium stores instructions used to implement the method according to any one of the second aspect or the possible implementations of the second aspect.

According to a seventh aspect, this application provides a computer program product including instructions. When the computer program product runs on a computer, the computer is enabled to perform the method according to any one of the first aspect or the possible implementations of the first aspect.

According to an eighth aspect, this application provides a computer program product including instructions. When the computer program product runs on a computer, the computer is enabled to perform the method according to any one of the second aspect or the possible implementations of the second aspect.

According to a ninth aspect, an embodiment of this application provides an apparatus. The apparatus includes a processor and a memory, the memory is configured to store instructions, and the processor executes the instructions stored in the processor, so that the apparatus performs the method according to any one of the first aspect or the possible implementations of the first aspect.

According to a tenth aspect, an embodiment of this application provides an apparatus. The apparatus includes a processor and a memory, the memory is configured to store instructions, and the processor executes the instructions stored in the processor, so that the apparatus performs the method according to any one of the second aspect or the possible implementations of the second aspect.

According to an eleventh aspect, an embodiment of this application provides a system. The system includes a terminal device and a network device, the terminal device may implement the method according to any one of the first aspect or the possible implementations of the second aspect, and the network device may implement the method according to any one of the second aspect or the possible implementations of the second aspect.

DESCRIPTION OF EMBODIMENTS

Figure 1:
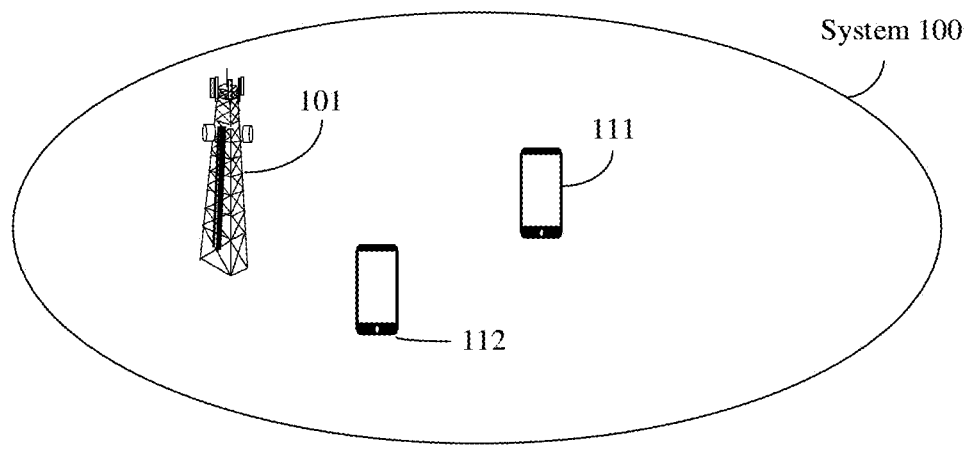
FIG. 1 is a schematic diagram of a communication system.

The following describes technical solutions of this application with reference to accompanying drawings.

The technical solutions in embodiments of this application may be applied to various communication systems, for example, a 5th generation (5th Generation, 5G) system, a new radio (New Radio, NR) system, or a future communication system, for example, 6G or 7G.

A terminal apparatus in the embodiments of this application may be a terminal device, or may be a component, for example, a chip or a circuit, that is used in the terminal device.

The terminal device in the embodiments of this application may also be referred to as user equipment, an access terminal, a subscriber unit, a subscriber station, a mobile station, a remote station, a remote terminal, a mobile device, a user terminal, a terminal, a wireless communication device, a user agent, or a user apparatus. Alternatively, the terminal device may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, a vehicle-mounted device, a wearable device, a terminal device in a future 5G, 6G, or 7G network, a terminal device in a future evolved public land mobile communication network (Public Land Mobile Network, PLMN), a terminal device in machine-to-machine (Machine to Machine, M2M) communication, a terminal device in massive machine-type communications (massive Machine Type of Communication, mMTC), or the like. This is not limited in the embodiments of this application.

A network apparatus in the embodiments of this application may be a network device, or may be a component, for example, a chip or a circuit, that is used in the network device.

The network device in the embodiments of this application may be a device configured to communicate with the terminal device. The network device may be a network device in a future 5G, 6G, or 7G network, a network device in a future evolved PLMN network, or the like. This is not limited in the embodiments of this application.

As described above, a terminal apparatus whose bandwidth capability is limited cannot receive or detect information that a bandwidth exceeds the bandwidth capability of the terminal apparatus. Therefore, if the bandwidth capability of the terminal apparatus is quite large, and is greater than a bandwidth occupied by information sent by the network apparatus, there is no problem that the information sent by the network apparatus cannot be received. Therefore, usually, only a terminal apparatus whose bandwidth capability is less than a bandwidth of some information sent by the network apparatus has a problem that the terminal apparatus cannot receive the information sent by the network apparatus. Therefore, the terminal apparatus may be referred to as a narrowband terminal apparatus.

For example, provided that a terminal apparatus whose bandwidth capability is less than a specific bandwidth, the terminal apparatus may be referred to as a narrowband terminal apparatus. For example, if the specific bandwidth is 8.64 MHz, all terminal apparatuses whose bandwidth capabilities are less than 8.64 MHz may be referred to as narrowband terminal apparatuses. For another example, if the specific bandwidth is 17.28 MHz, all terminal apparatuses whose bandwidth capabilities are less than 17.28 MHz may be referred to as narrowband terminal apparatuses. It can be learned that the narrowband terminal apparatus does not mean a terminal apparatus whose bandwidth capability is less than a fixed value. A bandwidth capability of the narrowband terminal device may vary with the specific bandwidth. In other words, if a bandwidth capability of a terminal apparatus is less than a specific bandwidth, the terminal apparatus may be referred to as a narrowband terminal apparatus. Further, the narrowband terminal apparatuses may also include a plurality of types of narrowband terminal apparatuses, and each type of narrowband terminal apparatus has a different bandwidth capability.

Optionally, in some embodiments, the narrowband terminal apparatus may be a terminal apparatus applied to an mMTC scenario.

Optionally, in some other embodiments, the narrowband terminal apparatus may be a terminal apparatus in an M2M communication scenario.

For ease of description and distinguishing, the terminal apparatuses in the embodiments of this application include a legacy (legacy) terminal apparatus and at least one type of narrowband terminal apparatus. A bandwidth size supported by the legacy terminal apparatus is greater than a bandwidth size supported by the at least one type of narrowband terminal apparatus.

Figure 2:
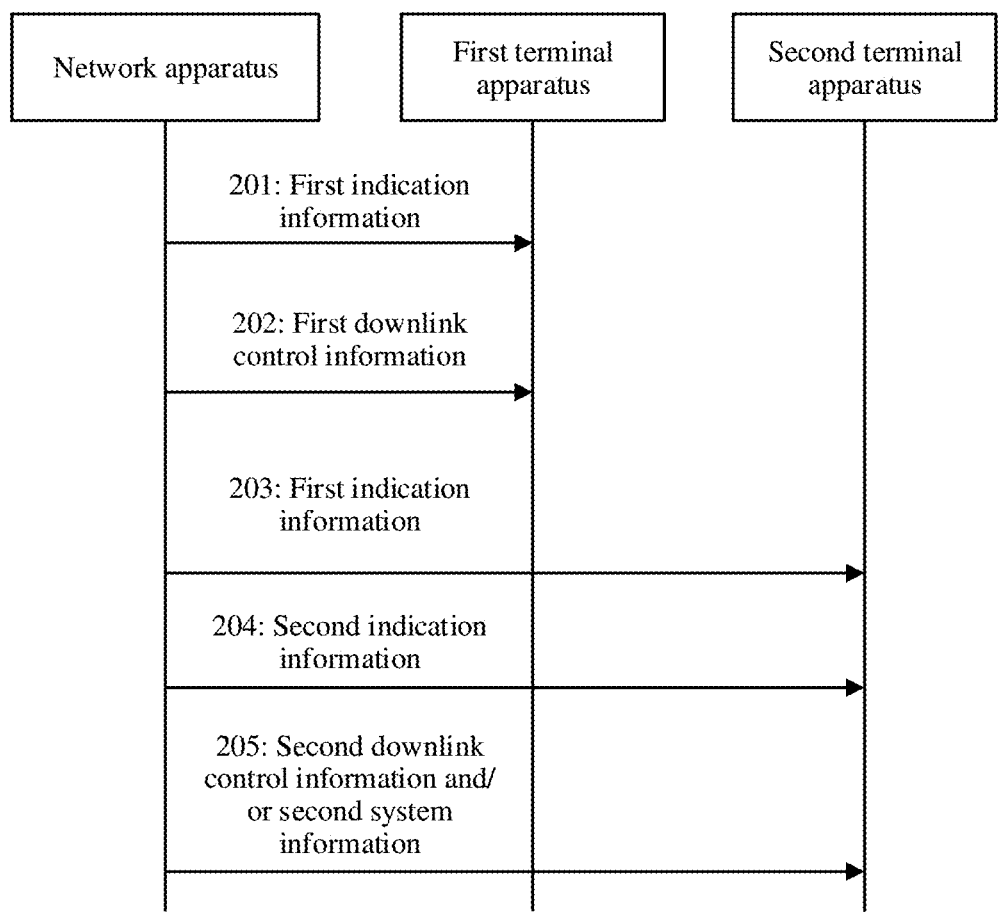
FIG. 2 is a schematic flowchart of a communication method according to an embodiment of this application.

FIG. 1 is a schematic diagram of a communication system. As shown in FIG. 1, the system 100 includes a network apparatus 101, a terminal apparatus 111, and a terminal apparatus 112. A person skilled in the art may understand that a network apparatus and a terminal apparatus that interact in the communication system and a communication method shown in FIG. 2 are a network device and a terminal device respectively. For ease of description, the network apparatus and the terminal apparatus are used to explain and describe the solutions. When some of the following content indicates that the network apparatus and the terminal apparatus are components of the network device and the terminal device respectively, it should not be understood that the network apparatus and the terminal apparatus are the network device and the terminal device.

Optionally, in some embodiments, the terminal apparatus 111 is a legacy terminal apparatus, and the terminal apparatus 112 is a narrowband terminal apparatus.

Optionally, in some other embodiments, both the terminal apparatus 111 and the terminal apparatus 112 are narrowband terminal apparatuses, but the terminal apparatus 111 and the terminal apparatus 112 support different bandwidths. For example, a bandwidth supported by the terminal apparatus 111 is 17.28 MHz, and a bandwidth supported by the terminal apparatus 112 is 8.64 MHz.

In the following specific implementations, a first terminal apparatus may be understood as the terminal apparatus 111, and a second terminal apparatus may be understood as the terminal apparatus 112.

FIG. 2 is a schematic flowchart of a communication method according to an embodiment of this application. The method shown in FIG. 2 may be used in the system 100 shown in FIG. 1.

201: A network apparatus sends first indication information to a first terminal apparatus, where the first indication information is carried on a first physical broadcast channel (Physical Broadcast Channel, PBCH). Correspondingly, the first terminal apparatus receives the first indication information from the network apparatus. The first indication information indicates a first frequency domain resource, the first frequency domain resource is used for transmission of first downlink control information, and the first downlink control information is used to schedule first system information.

Downlink control information may be information carried on a physical downlink control channel (Physical Downlink Control Channel, PDCCH). System information may be information carried in a system information block (System Information Block, SIB). For example, the system information may be remaining minimum system information (remaining minimum system information, RMSI) carried in a system information block 1 (SIB 1). For example, the first downlink control information may also be referred to as first PDCCH information, and second downlink control information may also be referred to as second PDCCH information. The first system information may be first RMSI, and second system information may be second RMSI.

Optionally, in some embodiments, a frequency domain resource used for transmission of the downlink control information may be the same as a frequency domain resource used for transmission of the system information. In other words, a frequency domain resource used for transmission of the first downlink control information may be the same as a frequency domain resource used for transmission of the first system information, and a frequency domain resource used for transmission of the second downlink control information may be the same as a frequency domain resource used for transmission of the second system information.

The network apparatus may send the first indication information to the first terminal apparatus in a broadcast manner. Alternatively, the network apparatus may directly send the first indication information to the first terminal apparatus.

Optionally, in some embodiments, the first indication information may be carried in first RMSI-PDCCH configuration information carried on the first PBCH. The first indication information may be in a first master information block (Master Information Block, MIB). In other words, the first MIB includes the first RMSI-PDCCH configuration information. The first RMSI-PDCCH configuration information includes: indication information of a first control resource set for a type 0-PDCCH common search space set (control resource set for Type0-PDCCH common search space set) and indication information of a first PDCCH monitoring occasion for a type 0-PDCCH common search space set (PDCCH monitoring occasion for Type0-PDCCH common search space set). For ease of description, the following uses a CORESET 0 to represent a control resource set for a type 0-PDCCH common search space set, and uses a monitoring occasion to represent a PDCCH monitoring occasion for a type 0-PDCCH common search space (common search space, CSS). Correspondingly, the indication information of the first control resource set for a type 0-PDCCH common search space set may be referred to as indication information of a first CORESET 0, and the indication information of the first PDCCH monitoring occasion for a type 0-PDCCH common search space set may be referred to as indication information of a first monitoring occasion.

It should be noted herein that the type 0-PDCCH common search space set is one of a plurality of types of common search space sets defined in a conventional technology. In addition to type 0, there are type 1, type 2, and the like. The type 0-PDCCH common search space set may be used to monitor downlink control information (Downlink Control Information) of cyclic redundancy check (Cyclic Redundancy Check, CRC) scrambled by using a system information-radio network temporary identifier (System Information-Radio Network Temporary Identifier, SI-RNTI).

The indication information of the first CORESET 0 may be used to indicate the first frequency domain resource. In other words, the first indication information may be the indication information of the first CORESET 0 in the first RMSI-PDCCH configuration information.

Optionally, in addition to indicating the first frequency domain resource, the indication information of the first CORESET 0 may be further used to indicate a time domain symbol used for transmission of the first downlink control information. The indication information of the first monitoring occasion may be used to indicate at least one of a system frame number and a slot number that are used for transmission of the first downlink control information.

Optionally, in some other embodiments, the first indication information may be dedicated information that is carried on the first PBCH and that is used to indicate the first frequency domain resource. In other words, the first indication information may be indication information that is different from the indication information of the first CORESET 0 and that is dedicated to indicating the first frequency domain resource. The first indication information may be used only to indicate the first frequency domain resource.

Optionally, in some embodiments, a manner in which the first indication information indicates the first frequency domain resource may include: The first indication information indicates a quantity of resource blocks (Resource Blocks, RBs) occupied by the first frequency domain resource. In other words, the first indication information may indicate a quantity of resource blocks (resource blocks, RBs) of the control resource set for a type 0-PDCCH common search space set (number of RBs of control resource set for Type0-PDCCH common search space set). Quantities of resource blocks of different control resource sets for type 0-PDCCH common search space sets (quantities of RBs in a common search space for short below, for ease of description) correspond to different bandwidths. For example, a subcarrier spacing (subcarrier spacing, SCS) is 15 kHz, and a correspondence between a quantity of RBs in a common search space and a bandwidth may be shown in Table 1.

TABLE 1

| Quantity of RBs in the common search space | Bandwidth |
| --- | --- |
| 24 | 4.32 MHz |
| 48 | 8.64 MHz |
| 96 | 17.28 MHz |

It may be understood that Table 1 shows only several typical types of correspondences between the quantity of RBs in the common search space and the bandwidth for ease of understanding of the correspondence between the quantity of RBs in the common search space and the bandwidth, and this does not mean that there are only three types of correspondences between the quantity of RBs in the common search space and the bandwidth shown in Table 1.

Optionally, in some other embodiments, a manner in which the first indication information indicates the first frequency domain resource may include: The first indication information indicates a bandwidth of the first frequency domain resource.

Optionally, in some other embodiments, a manner in which the first indication information indicates the first frequency domain resource may be further used to indicate a frequency domain position of the first frequency domain resource in addition to indicating the quantity of RBs or the bandwidth occupied by the first frequency domain resource.

Optionally, in some other embodiments, the first indication information may indicate only a frequency domain position of the first frequency domain resource.

Optionally, in some embodiments, the frequency domain resource used for transmission of the first downlink control information may be the same as a frequency domain resource of a first initial active (initial active) downlink (downlink, DL) bandwidth part (bandwidth part, BWP). In other words, the first frequency domain resource may be the same as the frequency domain resource of the first initial active downlink BWP. In this case, the first indication information may be further used to indicate the frequency domain resource of the first initial active downlink BWP. In other words, the frequency domain resource of the first initial active downlink BWP is indicated by using the first indication information.

It should be noted herein that the network apparatus may configure one or more downlink/uplink BWPs for the terminal apparatus. The BWP may include consecutive physical resource blocks (physical resource blocks, PRBs) in frequency domain. When a plurality of BWPs (for example, a plurality of uplink BWPs or a plurality of downlink BWPs) are configured, the plurality of BWPs may overlap (overlap) in frequency domain. Further, an initial active downlink BWP is a BWP used by the terminal apparatus to perform radio link monitoring and radio resource management measurement, and the initial active downlink BWP may be used to schedule a system information block type 1 (system information block type 1, SIB1).

202: The network apparatus may send the first downlink control information and/or the first system information to the first terminal apparatus on the first frequency domain resource. Correspondingly, the first terminal apparatus may receive, on the first frequency domain resource, the first downlink control information and/or the first system information sent by the network apparatus.

Optionally, in some embodiments, when the first terminal apparatus is a legacy terminal apparatus, that the network apparatus sends the first downlink control information and/or the first system information to the first terminal apparatus on the first frequency domain resource includes: The network apparatus sends the first downlink control information and the first system information to the first terminal apparatus on the first frequency domain resource. Correspondingly, that the first terminal apparatus receives, on the first frequency domain resource, the first downlink control information and/or the first system information sent by the network apparatus includes: The first terminal apparatus receives, on the first frequency domain resource, the first downlink control information and the first system information sent by the network apparatus.

Optionally, in some embodiments, when the first terminal apparatus is a narrowband terminal apparatus, and a bandwidth of the first frequency domain resource is less than or equal to a bandwidth supported by the first terminal apparatus, the network apparatus may further send the first downlink control information and/or the first system information to the first terminal apparatus on the first frequency domain resource. Correspondingly, the terminal apparatus may receive, on the first frequency domain resource, the first downlink control information and/or the first system information sent by the network apparatus.

In these embodiments, further optionally, that the network apparatus sends the first downlink control information and/or the first system information to the first terminal apparatus on the first frequency domain resource includes: The network apparatus sends the first downlink control information and the first system information to the first terminal apparatus on the first frequency domain resource. Correspondingly, that the first terminal apparatus receives, on the first frequency domain resource, the first downlink control information and/or the first system information sent by the network apparatus includes: The first terminal apparatus receives, on the first frequency domain resource, the first downlink control information and the first system information sent by the network apparatus.

In these embodiments, further optionally, that the network apparatus may send the first downlink control information and/or the first system information to the first terminal apparatus on the first frequency domain resource includes: The network apparatus sends the first system information to the first terminal apparatus on the first frequency domain resource. Correspondingly, that the first terminal apparatus receives, on the first frequency domain resource, the first downlink control information and/or the first system information sent by the network apparatus includes: The first terminal apparatus receives, on the first frequency domain resource, the first system information sent by the network apparatus. In this embodiment, the control information of the first system information does not need to be scheduled, and the first system information is sent and received on a predefined time-frequency resource. This reduces resource overheads for sending the downlink control information.

In these embodiments, further optionally, that the network apparatus sends the first downlink control information and/or the first system information to the first terminal apparatus on the first frequency domain resource includes: The network apparatus sends the first downlink control information to the first terminal apparatus on the first frequency domain resource. Correspondingly, that the first terminal apparatus receives, on the first frequency domain resource, the first downlink control information and/or the first system information sent by the network apparatus includes: The first terminal apparatus receives, on the first frequency domain resource, the first downlink control information sent by the network apparatus.

The following is described by using an example in which the network apparatus sends the first downlink control information and the first system information to the first terminal apparatus, and the first terminal apparatus receives the first downlink control information and the first system information.

It is assumed that the first terminal apparatus is a legacy terminal apparatus and the first indication information is carried in the first RMSI-PDCCH configuration information. In this case, the first terminal apparatus may receive the first downlink control information based on the first RMSI-PDCCH configuration information, and receive the first system information based on the first downlink control information. The first downlink control information may be information carried on a PDCCH (first PDCCH information for short below, for ease of description), and the first system information may be RMSI (first RMSI for short below, for ease of description). Specifically, the first terminal apparatus determines, based on the indication information of the first CORESET 0 in the first RMSI-PDCCH configuration information, a frequency domain resource (namely, the first frequency domain resource) used to receive the first PDCCH information; receives the first PDCCH information on the first frequency domain resource; and receives the first RMSI on the first frequency domain resource based on the first PDCCH information. A specific implementation in which the first terminal apparatus receives the first PDCCH information and the first RMSI based on the first RMSI-PDCCH configuration information is consistent with a specific implementation in which an existing legacy terminal apparatus receives downlink control information (for example, PDCCH information) and system information (for example, RMSI). For brevity, details are not described herein.

It is assumed that the first terminal apparatus is a narrow-band terminal apparatus and a bandwidth capability of the first terminal apparatus is $K_1$ MHz. $K_1$ is a number greater than 0. For example, $K_1$ may be equal to 10. It is assumed that the first indication information is carried in the first RMSI-PDCCH configuration information. In this case, the first terminal apparatus may determine the bandwidth of the first frequency domain resource based on the first RMSI-PDCCH configuration information. It is assumed that the bandwidth of the first frequency domain resource is $K_2$ MHz. $K_2$ is a number greater than 0 and less than or equal to $K_1$. For example, $K_2$ may be equal to 8.64. In other words, the bandwidth of the first frequency domain resource is less than the bandwidth capability of the first terminal apparatus. Therefore, the first terminal apparatus may receive the first PDCCH information and the first RMSI on the first frequency domain resource. In this case, the first terminal apparatus may receive the first PDCCH information based on the first RMSI-PDCCH configuration information; and receive the first RMSI based on the first PDCCH information. Specifically, the first terminal apparatus determines, based on the indication information of the first CORESET 0 in the first RMSI-PDCCH configuration information, a frequency domain resource (namely, the first frequency domain resource) used to receive the first PDCCH information; receives the first PDCCH information on the first frequency domain resource; and receives the first RMSI on the first frequency domain resource based on the first PDCCH information. A specific implementation in which the first terminal apparatus receives the first PDCCH information and the first RMSI based on the first RMSI-PDCCH configuration information is consistent with a specific implementation in which an existing legacy terminal apparatus receives downlink control information (for example, PDCCH information) and system information (for example, RMSI). For brevity, details are not described herein.

The following is described by using an example in which the network apparatus sends the first system information to the first terminal apparatus, and the first terminal apparatus receives the first system information.

It is assumed that the first terminal apparatus is a legacy terminal apparatus and the first indication information is carried in the first RMSI-PDCCH configuration information. In this case, the first terminal apparatus may receive the first system information based on the first RMSI-PDCCH configuration information, and the first system information may be RMSI (first RMSI for short below, for ease of description). Specifically, the first terminal apparatus determines, based on the first CORESET 0 in the first RMSI-PDCCH configuration information, a frequency domain resource (namely, the first frequency domain resource) used to receive the first RMSI information; and receives the first RMSI on the first frequency domain resource.

It is assumed that the first terminal apparatus is a narrow-band terminal apparatus and a bandwidth capability of the first terminal apparatus is $K_1$ MHz. $K_1$ is a number greater than 0. For example, $K_1$ may be equal to 10. It is assumed that the first indication information is carried in the first RMSI-PDCCH configuration information. In this case, the first terminal apparatus may determine the bandwidth of the first frequency domain resource based on the first RMSI-PDCCH configuration information. It is assumed that the bandwidth of the first frequency domain resource is $K_2$ MHz. $K_2$ is a number greater than 0 and less than or equal to $K_1$. For example, $K_2$ may be equal to 8.64. In other words, the bandwidth of the first frequency domain resource is less than the bandwidth capability of the first terminal apparatus. Therefore, the first terminal apparatus may receive the first RMSI on the first frequency domain resource. In this case, the first terminal apparatus may receive the first RMSI based on the first RMSI-PDCCH configuration information. Specifically, the first terminal apparatus determines, based on the first CORESET 0 in the first RMSI-PDCCH configuration information, a frequency domain resource (namely, the first frequency domain resource) used to receive the first RMSI information; and receives the first RMSI on the first frequency domain resource.

The following is described by using an example in which the network apparatus sends the first downlink control information to the first terminal apparatus, and the first terminal apparatus receives the first downlink control information.

It is assumed that the first terminal apparatus is a legacy terminal apparatus and the first indication information is carried in the first RMSI-PDCCH configuration information. In this case, the first terminal apparatus may receive the first downlink control information based on the first RMSI-PDCCH configuration information, and the first downlink control information is information carried on a PDCCH (first PDCCH information for short below, for ease of description). Specifically, the first terminal apparatus determines, based on the first CORESET 0 in the first RMSI-PDCCH configuration information, a frequency domain resource (namely, the first frequency domain resource) used to receive the first PDCCH information; and receives the first PDCCH information on the first frequency domain resource.

It is assumed that the first terminal apparatus is a narrow-band terminal apparatus and a bandwidth capability of the first terminal apparatus is $K_1$ MHz. $K_1$ is a number greater than 0. For example, $K_1$ may be equal to 10. It is assumed that the first indication information is carried in the first RMSI-PDCCH configuration information. In this case, the first terminal apparatus may determine the bandwidth of the first frequency domain resource based on the first RMSI-PDCCH configuration information. It is assumed that the bandwidth of the first frequency domain resource is $K_2$ MHz. $K_2$ is a number greater than 0 and less than or equal to $K_1$. For example, $K_2$ may be equal to 8.64. In other words, the bandwidth of the first frequency domain resource is less than the bandwidth capability of the first terminal apparatus. Therefore, the first terminal apparatus may receive the first PDCCH information on the first frequency domain resource. In this case, the first terminal apparatus may receive the first PDCCH information based on the first RMSI-PDCCH configuration information. Specifically, the first terminal apparatus determines, based on the first CORESET 0 in the first RMSI-PDCCH configuration information, a frequency domain resource (namely, the first frequency domain resource) used to receive the first PDCCH information; and receives the first PDCCH information on the first frequency domain resource.

The indication information of the first CORESET 0 may be one index in one configuration table of a plurality of CORESET 0 configuration tables corresponding to legacy bandwidths. Therefore, the indication information of the first CORESET 0 may also be referred to as a first CORESET configuration index. For ease of description, the CORESET 0 configuration table corresponding to the legacy bandwidth is referred to as a legacy CORESET configuration table below. Different legacy CORESET configuration tables correspond to different subcarrier spacings and different minimum channel bandwidths (minimum channel bandwidths). For example, Table 2 is a legacy CORESET configuration table when a subcarrier spacing is 15 kHz and a minimum channel bandwidth is 5 MHz or 10 MHz.

TABLE 2

| Index (Index) | SS/PBCH block and control resource set multiplexing pattern (SS/PBCH block and control resource set multiplexing pattern) | Quantity of RBs (Number of RBs): $N_{RB}^{CORESET}$ | Quantity of symbols (Number of Symbols): $N_{symb}^{CORESET}$ | Offset (symbols) (Offset (RBs)) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved (Reserved) | | | |

It can be learned that the entry of quantity of RBs in Table 2 may represent a frequency domain resource. For example, a value of the indication information of the first CORESET 0 may be 4. That the entry of quantity of RBs corresponding to the index value 4 is 24 indicates that the bandwidth of the frequency domain resource is 24 RBs. In other words, the bandwidth of the first frequency domain resource indicated by the indication information of the first CORESET 0 is 24 RBs. The entry of quantity of symbols in Table 2 may indicate a quantity of symbols occupied in time domain. For example, that the entry of quantity of symbols corresponding to the index value 4 is 3 may indicate that three OFDM symbols are occupied in time domain. In this way, when the subcarrier spacing is 15 kHz and the minimum channel bandwidth is 5 MHz or 10 MHz, if the first terminal apparatus receives the indication information that is of the first CORESET 0 and whose value is 4, the first terminal apparatus may determine, based on the legacy CORESET configuration table shown in Table 2, that the bandwidth of the first frequency domain resource is 24 RBs.

Similarly, the indication information of the first monitoring occasion may also be one index in a plurality of monitoring occasion configuration tables corresponding to legacy bandwidths. Therefore, the indication information of the first monitoring occasion may also be referred to as a first CSS 0 monitoring occasion configuration index. For ease of description, the monitoring occasion configuration table corresponding to the legacy bandwidth is referred to as a legacy monitoring occasion configuration table. Different legacy monitoring occasion configuration tables correspond to different CORESET multiplexing patterns (multiplexing patterns) and/or different frequency ranges (frequency ranges, FRs). For example, Table 3 is a legacy monitoring occasion configuration table when a CORESET multiplexing pattern 1 and an FR 1 are used.

TABLE 3

| Index | O | Quantity of search space sets per slot (Number of search space sets per slot) | M | First symbol index |
|---|---|---|---|---|
| 0 | 0 | 1 | 1 | 0 |
| 1 | 0 | 2 | ½ | {0, if i is an even number}, { $N_{symb}^{CORESET}$, if i is an odd number} |
| 2 | 2 | 1 | 1 | 0 |
| 3 | 2 | 2 | ½ | {0, if i is an even number}, { $N_{symb}^{CORESET}$, if i is an odd number} |
| 4 | 5 | 1 | 1 | 0 |
| 5 | 5 | 2 | ½ | {0, if i is an even number}, { $N_{symb}^{CORESET}$, if i is an odd number} |
| 6 | 7 | 1 | 1 | 0 |
| 7 | 7 | 2 | ½ | {0, if i is an even number}, { $N_{symb}^{CORESET}$, if i is an odd number} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

The indication information that is of the first monitoring occasion and that is sent by the network apparatus to the first terminal apparatus may be an index in Table 3. The first terminal apparatus may determine, based on the index value, the system frame number and the slot number that are used for transmission of the first downlink control information. Specifically, the first terminal apparatus may determine the system frame number $SFN_C$ and the slot number $n_0$ according to the following formula:

$$n_0 = (O \cdot 2^\mu + \lfloor i \cdot M \rfloor) \bmod N_{slot}^{frame,\mu} \qquad \text{Formula 1.1}$$

$SFN_C \bmod 2=0$, if $\lfloor (O \cdot 2^\mu + \lfloor i \cdot M \rfloor)/N_{slot}^{frame,\mu} \rfloor \bmod 2=0$.

Alternatively, $SFN_C \bmod 2=1$, if $\lfloor (O \cdot 2^\mu + \lfloor i \cdot M \rfloor)/N_{slot}^{frame,\mu} \rfloor \bmod 2=1$.

O and M are parameters used to determine the system frame number $SFN_C$ and the slot number no, and values of O and M may be obtained from Table 3. Specifically, the first terminal apparatus may determine, based on the received index (namely, the indication information of the first monitoring occasion), the values of O and M corresponding to the index. i represents an index (index) of an SSB, μ represents different SCS configuration indexes, $N_{slot}^{frame,\mu}$ represents a quantity of slots included in one frame when the different SCS configuration indexes are μ, a symbol $\lfloor \ \rfloor$ represents rounding down, and mod represents a modulo operation.

Optionally, in some embodiments, a most significant bit (most significant bit, MSB) in the first RMSI-PDCCH configuration information may be the indication information of the first CORESET 0, and a least significant bit (least significant bit, LSB) in the first RMSI-PDCCH configuration information may be the indication information of the first monitoring occasion. For example, a length of the first RMSI-PDCCH configuration information is 8 bits, the $0^{th}$ bit to the $3^{rd}$ bit in the 8 bits are the indication information of the first CORESET 0, and the $4^{th}$ bit to the $7^{th}$ bit are the indication information of the first monitoring occasion.

For example, it is assumed that when the subcarrier spacing is 15 kHz, the minimum channel bandwidth is 5 MHz or 10 MHz, and the CORESET multiplexing pattern 1 and the FR 1 are used, a monitoring occasion configuration table is used. If the value of the first RMSI-PDCCH configuration information is 01000010, the first terminal apparatus may determine, based on the legacy CORESET configuration table shown in Table 2, that the bandwidth of the first frequency domain resource is 24 RBs (namely, the quantity of RBs in the entry whose index value is 4 (0100 in binary)); and determine, based on the legacy monitoring occasion configuration table shown in Table 3, that the values of O and M are 2 and 1 respectively (namely, the values of O and M in the entry whose index value is 2 (0010 in binary)), and determine the system frame number $SFN_C$ and the slot number no according to the formula 1.1.

Optionally, in some other embodiments, an LSB in the first RMSI-PDCCH configuration information may be the indication information of the first CORESET 0, and an MSB in the first RMSI-PDCCH configuration information may be the indication information of the first monitoring moment.

203: The network apparatus may send the first indication information to the second terminal apparatus. Correspondingly, the second terminal apparatus may receive the first indication information from the network apparatus. A manner in which the network apparatus sends the first indication information to the second terminal apparatus is the same as the manner in which the network apparatus sends the first indication information to the first terminal apparatus, and content of the first indication information sent to the first terminal apparatus is also the same as content of the first indication sent to the second terminal apparatus. For brevity, details are not described herein.

Optionally, in some embodiments, the network apparatus may simultaneously send the first indication information to the first terminal apparatus and the second terminal apparatus. In other words, step 203 and step 201 may be simultaneously performed. Optionally, in some other embodiments, the network apparatus may not simultaneously send the first indication information to the first terminal apparatus and the second terminal apparatus. In other words, step 203 and step 201 may not be simultaneously performed. For example, the first terminal apparatus may access the network apparatus before the second terminal apparatus. In this case, the network apparatus may first send the first indication information to the first terminal apparatus, and then send the first indication information to the second terminal apparatus. For another example, the second terminal apparatus may access the network apparatus before the first terminal apparatus. In this case, the network apparatus may first send the first indication information to the second terminal apparatus, and then send the first indication information to the first terminal apparatus.

A manner in which the network device sends the downlink control information and/or the system information may be preconfigured or predefined. For example, in some embodiments, the network device sends the system information and/or the downlink control information on a preconfigured or predefined frequency domain resource. In this case, the network device does not need to perform step 204 and the step after step 204.

Optionally, in some other embodiments, the network apparatus may perform step 204 and the step after step 204. For example, the network device may be preconfigured to send the system information and/or the downlink control information on at least two frequency domain resources. It may be understood that, in the preconfiguration, the system information and/or the downlink control information may be sent on the at least two frequency domain resources, and a bandwidth size of each frequency domain resource may be further configured. Bandwidth sizes of any two of the at least two frequency domain resources may be the same or may be different. It is assumed that the first frequency domain resource and a second frequency domain resource are two of the at least two frequency domain resources. In some embodiments, a bandwidth size of the first frequency domain resource may be the same as a bandwidth size of the second frequency domain resource. In some other embodiments, a bandwidth size of the first frequency domain resource may be different from a bandwidth size of the second frequency domain resource. When the bandwidth size of the first frequency domain resource is the same as the bandwidth size of the second frequency domain resource, a frequency domain range of the first frequency domain resource is different from a frequency domain range of the second frequency domain resource. That the frequency domain range of the first frequency domain resource is different from the frequency domain range of the second frequency domain resource may mean that the frequency domain range of the first frequency domain resource is completely different from the frequency domain range of the second frequency domain resource (that is, there is no intersection set between the first frequency domain resource and the second frequency domain resource in frequency domain), or may mean that the frequency domain range of the first frequency domain resource is not completely the same as the frequency domain range of the second frequency domain resource (that is, there is an intersection set between the first frequency domain resource and the second frequency domain resource in frequency domain).

Optionally, in some embodiments, the terminal apparatus may choose to receive the first downlink control information and/or the first system information on the first frequency domain resource, or receive the second downlink control information and/or the second system information on the second frequency domain resource based on the bandwidth of the frequency domain resource indicated by the first indication information. For example, if the bandwidth size supported by the terminal apparatus is less than the bandwidth size of the first frequency domain resource, the terminal apparatus may receive the second downlink control information and/or the second system information from the network apparatus on the second frequency domain resource. In other words, if the bandwidth size supported by the terminal apparatus is less than the bandwidth size of the first frequency domain resource, the terminal apparatus may perform step 204 and the step after step 204 (that is, the terminal apparatus is equivalent to the second terminal apparatus). For example, if the bandwidth size supported by the terminal apparatus is greater than the bandwidth size of the first frequency domain resource, the terminal apparatus may receive the first downlink control information and/or the first system information from the network apparatus on the first frequency domain resource. In other words, if the bandwidth size supported by the terminal apparatus is less than the bandwidth size of the first frequency domain resource, the terminal apparatus is equivalent to the first terminal apparatus that performs step 201 and step 202.

Optionally, in some embodiments, the terminal apparatus may choose to receive the first downlink control information and/or the first system information on the first frequency domain resource, or receive the second downlink control information and/or the second system information on the second frequency domain resource according to a preset rule. For example, based on identification information (for example, an international mobile subscriber identification identity (International Mobile Subscriber Identification Number, IMSI), an international mobile equipment identity (International Mobile Equipment Identity, IMEI), a media access control (Media Access Control, MAC) address, and the like) of the terminal apparatus, the terminal apparatus may select the frequency domain resource used to receive the downlink control information and/or the system information, and receive the downlink control information and/or the system information on the corresponding frequency domain resource.

Optionally, in some other embodiments, the terminal apparatus may select, based on time of accessing the network apparatus, the frequency domain resource used to receive the downlink control information.

Optionally, in some other embodiments, the network apparatus may indicate a specific frequency domain resource on which the terminal apparatus receives the downlink control information.

204: The network apparatus sends second indication information to the second terminal apparatus, where the second indication information is carried on a second PBCH, and the second indication information is used to indicate the second frequency domain resource. The second frequency domain resource is used for transmission of the second downlink control information and/or the second system information. The second downlink control information is used to schedule the second system information. Correspondingly, the second terminal apparatus may receive the second indication information from the network apparatus.

Optionally, in some embodiments, all frequency domain resources in the second frequency domain resource are used for transmission of the second downlink control information and/or the second system information. Alternatively, a part of frequency domain resources in the second frequency domain resource are used for transmission of the second downlink control information and/or the second system information.

Optionally, in some embodiments, a specific implementation of the second indication information is similar to the specific implementation of the first indication information. For example, the second indication information may be carried in second RMSI-PDCCH configuration information. The second RMSI-PDCCH configuration information includes indication information of a control resource set for a second PDCCH common search space set and indication information of a PDCCH monitoring occasion of the second PDCCH common search space set. The control resource set of the second PDCCH common search space set may be referred to as indication information of a second CORESET for short, and the PDCCH monitoring occasion of the second PDCCH common search space set may be referred to as indication information of a second monitoring occasion for short.

Optionally, in some embodiments, the indication information of the second CORESET may be one index in a plurality of CORESET 0 configuration tables corresponding to legacy bandwidths. In this case, the indication information of the second CORESET may also be referred to as indication information of a second control resource set for a type 0-PDCCH common search space set (which may be referred to as a second CORESET 0 for short). For a specific implementation of the indication information of the second CORESET, refer to the specific implementation of the indication information of the first CORESET 0. For brevity, details are not described herein again.

Optionally, in some other embodiments, the indication information of the second CORESET may be one index in a plurality of CORESET configuration tables corresponding to narrowbands. Therefore, the indication information of the second CORESET may also be referred to as a second CORESET configuration index. For ease of description, the CORESET configuration table corresponding to the narrowband is referred to as a narrowband CORESET configuration table below. Different narrowband CORESET configuration tables correspond to different subcarrier spacings and different minimum channel bandwidths (minimum channel bandwidths). For example, Table 4 is a narrowband CORESET configuration table when a subcarrier spacing is 15 kHz and a minimum channel bandwidth is 5 MHz or 10 MHz.

TABLE 4

| Index (Index) | SS/PBCH block and control resource set multiplexing pattern (SS/PBCH block and control resource set multiplexing pattern) | Quantity of RBs (Number of RBs): $N_{RB}^{CORESET}$ | Quantity of symbols (Number of Symbols): $N_{symb}^{CORESET}$ | Offset (symbols) (Offset (RBs)) |
|---|---|---|---|---|
| 0 | 1 | 12 | 2 | 0 |
| 1 | 1 | 12 | 2 | 2 |
| 2 | 1 | 12 | 2 | 4 |
| 3 | 1 | 12 | 3 | 0 |
| 4 | 1 | 12 | 3 | 2 |
| 5 | 1 | 12 | 3 | 4 |
| 6 | 1 | 24 | 2 | 0 |
| 7 | 1 | 24 | 2 | 2 |
| 8 | 1 | 24 | 2 | 4 |
| 9 | 1 | 24 | 3 | 0 |
| 10 | 1 | 24 | 3 | 2 |
| 11 | 1 | 24 | 3 | 4 |
| 6 | Reserved (Reserved) | | | |

It can be learned that the entry of quantity of RBs in Table 4 may represent a frequency domain resource. For example, a value of the indication information of the second CORESET may be 4. That the entry of quantity of RBs corresponding to the index value 4 is 12 indicates that the bandwidth of the frequency domain resource is 12 RBs. In other words, the bandwidth of the second frequency domain resource indicated by the indication information of the second CORESET is 12 RBs. The entry of quantity of symbols in Table 4 may indicate a quantity of symbols occupied in time domain. For example, that the entry of quantity of symbols corresponding to the index value 4 is 3 may indicate that three OFDM symbols are occupied in time domain. In this way, when the subcarrier spacing is 15 kHz and the minimum channel bandwidth is 5 MHz or 10 MHz, if the second terminal apparatus receives the indication information that is of the second CORESET and whose value is 4, the first terminal apparatus may determine, based on the narrowband CORESET configuration table shown in Table 4, that the bandwidth of the second frequency domain resource is 12 RBs.

Optionally, in some embodiments, the indication information of the second monitoring occasion may alternatively be one index in a plurality of monitoring occasion configuration tables corresponding to legacy bandwidths. In this case, for a specific implementation of the indication information of the second monitoring occasion, refer to the specific implementation of the indication information of the first monitoring occasion. For brevity, details are not described herein again.

Optionally, in some other embodiments, the indication information of the second monitoring occasion may alternatively be one index in a plurality of monitoring occasion configuration tables corresponding to narrowbands. Therefore, the indication information of the second monitoring occasion may also be referred to as a second CSS monitoring occasion configuration index. For ease of description, the monitoring occasion configuration table corresponding to the narrowband is referred to as a narrowband monitoring occasion configuration table. Different narrowband monitoring occasion configuration tables correspond to different CORESET multiplexing patterns (multiplexing patterns) and/or different frequency ranges (frequency ranges, FRs). For example, Table 5 is a narrowband monitoring occasion configuration table when a CORESET multiplexing pattern 1 and an FR 1 are used.

TABLE 5

| Index | Quantity of search space sets per slot (Number of search space sets per slot) | O | M | First symbol index |
|---|---|---|---|---|
| 0 | 0 | 1 | 1 | 0 |
| 1 | 0 | 2 | ½ | {0, if i is an even number}, { $N_{symb}^{CORESET}$, if i is an odd number} |
| 2 | 2 | 1 | 1 | 0 |
| 3 | 2 | 2 | ½ | {0, if i is an even number}, { $N_{symb}^{CORESET}$, if i is an odd number} |
| 4 | 5 | 1 | 1 | 0 |
| 5 | 5 | 2 | ½ | {0, if i is an even number}, { $N_{symb}^{CORESET}$, if i is an odd number} |
The indication information that is of the second monitoring occasion and that is sent by the network apparatus to the second terminal apparatus may be an index in Table 5. The second terminal apparatus may determine, based on the index value, a system frame number and a slot number that are used for transmission of the second downlink control information. Specifically, the second terminal apparatus may determine the system frame number $SFN_C$ and the slot number $n_0$ according to the following formula:

$$n_0 = (O \cdot 2^\mu + \lfloor i \cdot M \rfloor) \bmod N_{slot}^{frame,\mu} \quad \text{Formula 1.2}$$

$SFN_C \bmod 2=0$, if $\lfloor (O \cdot 2^\mu + \lfloor i \cdot M \rfloor)/N_{slot}^{frame,\mu} \rfloor \bmod 2=0$.

Alternatively, $SFN_C \bmod 2=1$, if $\lfloor (O \cdot 2^\mu + \lfloor i \cdot M \rfloor)/N_{slot}^{frame,\mu} \rfloor \bmod 2=1$.

Values of O and M may be obtained from Table 5. Specifically, the second terminal apparatus may determine, based on the received index (namely, the indication information of the second monitoring occasion), the values of O and M corresponding to the index. i represents an index (index) of an SSB, μ represents different SCS configuration indexes, $N_{slot}^{frame,\mu}$ represents a quantity of slots included in one frame when the different SCS configuration indexes are μ, a symbol $\lfloor \ \rfloor$ represents rounding down, and mod represents a modulo operation.

It may be understood that the narrowband CORESET configuration table is a possible implementation of narrowband CORESET configuration information. The narrowband CORESET configuration information may alternatively have another implementation. For example, in some possible implementations, the narrowband CORESET configuration information may include at least one candidate quantity of RBs. For example, the narrowband CORESET configuration information may be {4, 8, 16, 24}, where 4, 8, 16, and 24 are four candidate quantities of RBs, 4 represents a frequency domain resource corresponding to four RBs, 8 represents a frequency domain resource corresponding to eight RBs, and so on. In this case, the indication information of the second CORESET may be a specific quantity of RBs. For example, a value of the indication information of the second CORESET may be 24. In this case, the second frequency domain resource is a frequency domain resource corresponding to 24 RBs.

Similarly, the narrowband monitoring occasion configuration table is a possible implementation of the narrowband monitoring occasion configuration information. The narrowband monitoring occasion configuration information may alternatively have another implementation. For example, in some possible implementations, the narrowband monitoring occasion configuration information may include at least one candidate value of O and at least one candidate value of M. The value of the indication information of the second monitoring occasion may be one of the at least one candidate value of O and one of the at least one candidate value of M. For another example, in some other possible implementations, the narrowband monitoring occasion configuration information may include at least one candidate system frame number and at least one candidate slot number. The value of the indication information of the second monitoring occasion may be one of the at least one candidate system frame number and one of the at least one candidate slot number.

Optionally, in some embodiments, the second indication information may be dedicated indication information used to indicate the second frequency domain resource. For example, the second indication information may be used only to indicate the second frequency domain resource.

Optionally, in some embodiments, the second PBCH may alternatively carry a demodulation reference signal (demodulation reference signal, DMRS) used to decode the second PBCH. In addition, the second PBCH may be further used to carry other information. For example, the second PBCH may be further used to carry an mMTC dedicated parameter, an M2M communication parameter, and all or a part of configuration parameters on the first PBCH.

Optionally, in some embodiments, the second PBCH may alternatively carry an identifier indicating whether the second system information is updated. For example, when the terminal apparatus returns from outside normal coverage of a cell to the coverage again, resynchronization with the network apparatus in the cell needs to be performed, and the terminal apparatus may determine, based on the identifier indicating whether the system information is updated in the second PBCH, whether the second system information needs to be re-received. If the identifier indicates that the system information is not updated, the terminal apparatus does not need to re-receive the second system information. If the identifier indicates that the system information has been updated, the terminal apparatus continues to receive the second system information. The existence of the identifier may reduce an access delay and energy consumption of the terminal apparatus.

An advantage of indicating the second frequency domain resource by using the indication information in the second PBCH is that other parameters, including the parameters in the foregoing optional embodiments, may be simultaneously notified through the second PBCH.

The network apparatus may store a plurality of pieces of CORESET 0 configuration information (for example, the plurality of legacy CORESET configuration tables) corresponding to the legacy bandwidths and a plurality of pieces of CORESET configuration information (for example, the plurality of narrowband CORESET configuration tables) corresponding to the narrowbands. Both groups of configuration tables may include configuration tables corresponding to same subcarrier spacings and same minimum channel bandwidths. For example, the plurality of legacy CORESET configuration tables may include a legacy CORESET configuration table corresponding to a subcarrier spacing of 15 kHz and a minimum channel bandwidth of 5 MHz or 10 MHz (a first CORESET configuration table for short below, for ease of description), and the plurality of narrowband CORESET configuration tables may also include a narrowband CORESET configuration table with a subcarrier spacing of 15 kHz and a minimum channel bandwidth of 5 MHz or 10 MHz (a second CORESET configuration table for short below, for ease of description). When it is determined that the subcarrier spacing is 15 kHz and the minimum channel bandwidth is 5 MHz or 10 MHz, the network apparatus may determine, based on the PBCH used to carry the indication information (for example, the first indication information and the second indication information) used to indicate the frequency domain resource, that the index carried in the indication information is determined based on the first CORESET configuration table or the second CORESET configuration table. For example, when the subcarrier spacing is 15 kHz and the minimum channel bandwidth is 5 MHz or 10 MHz, if the PBCH used to carry the indication information is the first PBCH, the network apparatus may determine that an index corresponding to a quantity of to-be-indicated RBs in the first CORESET configuration table is an index value carried in the indication information; and if the PBCH used to carry the indication information is the second PBCH, the network apparatus may determine that an index corresponding to a quantity of to-be-indicated RBs in the second CORESET configuration table is an index value carried in the indication information.

Similarly, the terminal apparatus may also store a plurality of pieces of CORESET 0 configuration information (for example, the plurality of legacy CORESET configuration tables) corresponding to the legacy bandwidths and a plurality of pieces of CORESET configuration information (for example, the plurality of narrowband CORESET configuration tables) corresponding to the narrowbands. Both groups of configuration tables may include configuration tables corresponding to same subcarrier spacings and same minimum channel bandwidths. The terminal apparatus may determine, based on a PBCH used to carry the indication information (for example, the first indication information and the second indication information) used to indicate the frequency domain resource, a quantity of RBs corresponding to an index value that is in the indication information and that is determined based on the legacy CORESET configuration table or the narrowband CORESET configuration table. For example, when the subcarrier spacing is 15 kHz and the minimum channel bandwidth is 5 MHz or 10 MHz, if the PBCH used to carry the indication information is the first PBCH, the terminal apparatus may determine that the frequency domain resource indicated by the index value is the quantity of RBs corresponding to the index value in the first CORESET configuration table; and if the PBCH used to carry the indication information is the second PBCH, the terminal apparatus may determine that the frequency domain resource indicated by the index value is the quantity of RBs corresponding to the index value in the second CORESET configuration table.

As described above, in some embodiments, the first terminal apparatus may be a narrowband terminal apparatus. Because the first indication information received by the first terminal apparatus is carried on the first PBCH, the first terminal apparatus may determine, in the legacy CORESET configuration table, the first frequency domain resource indicated by the first indication information. Because the second indication information received by the second terminal apparatus is carried on the second PBCH, the second terminal apparatus may determine, in the narrowband CORESET configuration table, the second frequency domain resource indicated by the second indication information.

It may be understood that the indication information used to indicate the monitoring occasion of the system frame number and the slot number for transmitting the downlink control information and the indication information used to indicate the downlink control information (for example, the indication information of the first CORESET 0 and the indication information of the first monitoring occasion, and the indication information of the second CORESET and the indication information of the second monitoring occasion) are carried on a same PBCH. Therefore, the network apparatus and the terminal apparatus may determine the system frame number and the slot number based on monitoring occasion configuration information of the same type as the CORESET configuration information used for determining the frequency domain resource. For example, when the frequency domain resource used for transmission of the downlink control information is determined based on the legacy CORESET configuration table, the system frame number and the slot number that are used for transmission of the downlink control information are also determined based on the legacy monitoring occasion configuration table. When the frequency domain resource used for transmission of the downlink control information is determined based on the narrowband CORESET configuration table, the system frame number used for transmission of the downlink control information are also determined based on the narrowband monitoring occasion configuration table.

The first PBCH is located in a synchronization broadcast channel block. The synchronization broadcast channel block may also be referred to as a synchronization signal (Synchronization Signal, SS)/PBCH block (SS/PBCH block, SSB). The SSB further carries a primary synchronization signal (Primary Synchronization Signal, PSS) and a secondary synchronization signal (Secondary Synchronization Signal, PSS). For ease of description, a time-frequency resource of the second PBCH is referred to as a target time-frequency resource, and a time-frequency resource of the SSB is referred to as a reference time-frequency resource below.

Optionally, in some embodiments, the time-frequency resource of the second PBCH may be determined based on information carried on the first PBCH. For example, the first PBCH may carry information indicating the time-frequency resource occupied by the second PBCH or the second downlink control information.

Optionally, in some embodiments, a time domain resource of the target time-frequency resource is the same as a time domain resource of the PSS in the SSB. A frequency domain resource of the target time-frequency resource is a frequency domain resource subset of the SSB, and does not overlap a frequency domain resource of the PSS. In other words, there is no intersection set between the frequency domain resource of the target time-frequency resource and the frequency domain resource of the PSS.

Figure 4:
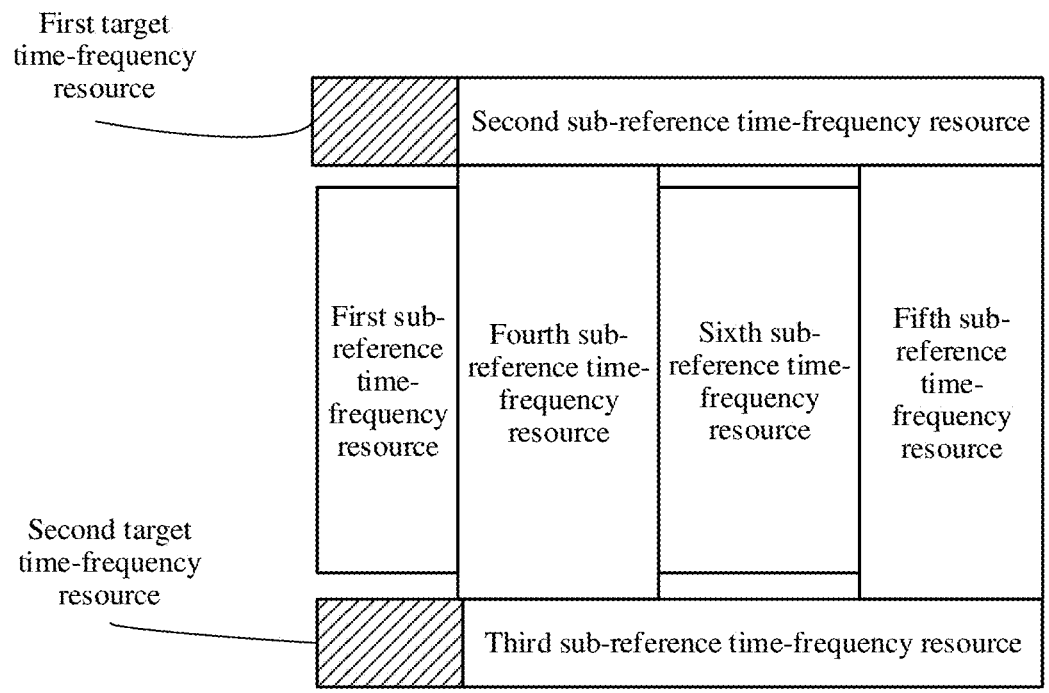
FIG. 4 is a schematic diagram of a reference time-frequency resource and target time-frequency resources.

FIG. 4 is a schematic diagram of a reference time-frequency resource and target time-frequency resources. The reference time-frequency resource shown in FIG. 4 includes a first sub-reference time-frequency resource, a second sub-reference time-frequency resource, a third sub-reference time-frequency resource, a fourth sub-reference time-frequency resource, a fifth sub-reference time-frequency resource, and a sixth sub-reference time-frequency resource.

The first sub-reference time-frequency resource is the time-frequency resource of the PSS in the SSB, the second sub-reference time-frequency resource to the fifth sub-reference time-frequency resource are the time-frequency resource of the first PBCH in the SSB, and the sixth sub-reference time-frequency resource is a time-frequency resource of the SSS in the SSB.

The target time-frequency resources shown in FIG. 4 include a first target time-frequency resource and a second target time-frequency resource.

Table 6 shows an example of a relationship between the reference time-frequency resource and the target time-frequency resources shown in FIG. 4.

TABLE 6

| Information whose transmission is to be performed | Time domain resource | Frequency domain resource |
| --- | --- | --- |
| PSS | 0 | 56, 57, . . . , 182 |
| SSS | 2 | 56, 57, . . . , 182 |
| Set to 0 | 0 | 48, 49, . . . , 55, 183, 184, . . . , 191 |
|  | 2 | 48, 49, . . . , 55, 183, 184, . . . , 191 |
| PBCH 1 | 1, 3 | 0, 1, . . . , 239 |
|  | 2 | 0, 1, . . . , 47, 192, 193, . . . , 239 |
| DMRS for PBCH 1 | 1, 3 | 0 + v, 4 + v, 8 + v, . . . , 236 + v |
|  | 2 | 0 + v, 4 + v, 8 + v, . . . , 44 + v |
| PBCH 2 | 0 | 0, 1, . . . , 47, 192, 193, . . . , 239 |
| DMRS for PBCH 2 | 0 | 0 + v, 4 + v, 8 + v, . . . , 44 + v, 192 + v, 196 + v, . . . , 236 + v |

The PSS in Table 6 is used to indicate the time-frequency resource of the PSS, namely, the first sub-reference time-frequency resource. The SSS is used to indicate the time-frequency resource of the SSS, namely, the sixth sub-reference time-frequency resource. PBCH 1 represents the time-frequency resource of the first PBCH. DMRS for PBCH 1 represents a DMRS for the first PBCH. PBCH 2 represents the time-frequency resource of the second PBCH. DMRS for PBCH 2 represents a DMRS for the second PBCH. Set to 0 represents a guard time-frequency resource. The guard time-frequency resource is not used for transmission of information. In other words, Set to 0 represents a time-frequency resource that is not used for transmission of information.

If the time domain resource in Table 6 is 0, it indicates that the time domain resource occupies the $0^{th}$ orthogonal frequency division multiplexing (Orthogonal Frequency Division Multiplexing, OFDM) symbol, 1 indicates that the time domain resource occupies the $1^{st}$ OFDM symbol, and so on. 0 in the frequency domain resource indicates that the frequency domain resource occupies the $0^{th}$ subcarrier (subcarrier), and 1 indicates that the frequency domain resource occupies the $1^{st}$ subcarrier. 56, 57, . . . , 182 in the frequency domain resource indicates that the frequency domain resource occupies the $56^{th}$ subcarrier to the $182^{nd}$ subcarrier. 0, 1, . . . , 47 in the frequency domain resource indicates that the frequency domain resource occupies the $0^{th}$ subcarrier to the $47^{th}$ subcarrier. 192, 193, . . . , 239 in the frequency domain resource indicates that the frequency domain resource occupies the $192^{nd}$ subcarrier to the $239^{th}$ subcarrier. 0+v, 4+v, 8+v, . . . , 236+v in the frequency domain resource indicates that one DMRS occurs at an interval of four subcarriers. $v=N_{ID}^{cell} \bmod 4$, where $N_{ID}^{cell}$ represents a physical cell identifier, and mod represents a modulo operation.

It can be learned that, as shown in Table 6, the time domain resource of the first target time-frequency resource is the same as the time domain resource of the first sub-reference time-frequency resource, and the frequency domain resource of the first target time-frequency resource is the same as the frequency domain resource of the second sub-reference time-frequency resource. The frequency domain resource of the first target time-frequency resource and the frequency domain resource of the first sub-reference time-frequency resource are separated by a guard time-frequency resource. In this way, mutual interference between the first sub-reference time-frequency resource and the first target time-frequency resource can be prevented. Similarly, the time domain resource of the second target time-frequency resource is the same as the time domain resource of the first sub-reference time-frequency resource, and the frequency domain resource of the second target time-frequency resource is the same as the frequency domain resource of the third sub-reference time-frequency resource. The frequency domain resource of the second target time-frequency resource and the frequency domain resource of the first sub-reference time-frequency resource are separated by a guard time-frequency resource. In this way, mutual interference between the first sub-reference time-frequency resource and the second target time-frequency resource can be prevented.

It may be understood that Table 6 shows only an example of the reference time-frequency resource and the target time-frequency resources. There may be another type of relationship between the reference time-frequency resource and the target time-frequency resources. For example, Table 7 shows another example of the relationship between the reference time-frequency resource and the target time-frequency resources corresponding to FIG. 4.

TABLE 7

| Information whose transmission is to be performed | Time domain resource | Frequency domain resource |
| --- | --- | --- |
| PSS | 0 | 56, 57, . . . , 182 |
| SSS | 2 | 56, 57, . . . , 182 |
| Set to 0 | 0 | 40, 41, . . . , 55, 183, 184, . . . , 194 |
|  | 2 | 48, 49, . . . , 55, 183, 184, . . . , 191 |
| PBCH 1 | 1, 3 | 0, 1, . . . , 239 |
|  | 2 | 0, 1, . . . , 47, 192, 193, . . . , 239 |
| DMRS for PBCH 1 | 1, 3 | 0 + v, 4 + v, 8 + v, . . . , 236 + v |
|  | 2 | 0 + v, 4 + v, 8 + v, . . . , 44 + v |
| PBCH 2 | 0 | 0, 1, . . . , 39, 196, . . . , 239 |
| DMRS for PBCH 2 | 0 | 0 + v, 4 + v, 8 + v, . . . , 36 + v, 196 + v, . . . , 236 + v |

Meanings of the items in Table 7 are the same as those in Table 6. Details are not described herein. It can be learned that, in Table 7, the time domain resource of the first target time-frequency resource is the same as the time domain resource of the first sub-reference time-frequency resource, and the frequency domain resource of the first target time-frequency resource is a frequency domain resource subset of the second sub-reference time-frequency resource. Similarly, the time domain resource of the second target time-frequency resource is the same as the time domain resource of the first sub-reference time-frequency resource, and the frequency domain resource of the second target time-frequency resource is a frequency domain resource subset of the third sub-reference time-frequency resource.

For another example, in Table 6 and Table 7, both the DMRS for the first PBCH and the DMRS for the second PBCH occur at an interval of four subcarriers. In some other embodiments, the interval between the DMRS for the first PBCH information and the DMRS for the second PBCH may alternatively be another positive integer, for example, one may occur at an interval of three subcarriers, or for another example, one may occur at an interval of five subcarriers, provided that the interval between the two DMRSs is less than a corresponding frequency domain range for the PBCH.

In addition, in Table 6 and Table 7, both the DMRS for the first PBCH and the DMRS for the second PBCH occur at an interval of four subcarriers. In other words, an interval between two DMRSs for the first PBCH is the same as an interval between two DMRSs for the second PBCH. In some other embodiments, the interval between the two DMRSs for the first PBCH and the interval between the two DMRSs for the second PBCH may be different. For example, one DMRS for the first PBCH occurs at an interval of three subcarriers, and one DMRS for the second PBCH occurs at an interval of four subcarriers.

The target time-frequency resources shown in FIG. 4 may include the first target time-frequency resource and the second target time-frequency resource. In some embodiments, the target time-frequency resource may be only one of the first target time-frequency resource and the second target time-frequency resource.

Figure 5:
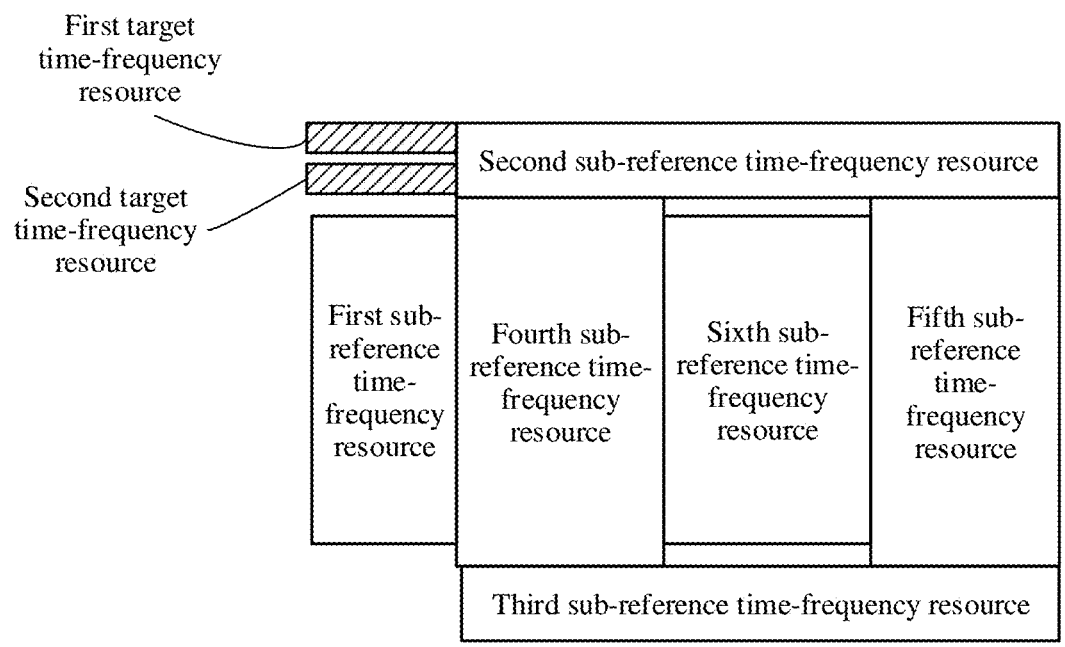
FIG. 5 is another schematic diagram of a reference time-frequency resource and target time-frequency resources.

FIG. 5 is another schematic diagram of a reference time-frequency resource and target time-frequency resources. The reference time-frequency resource shown in FIG. 5 includes a first sub-reference time-frequency resource, a second sub-reference time-frequency resource, a third sub-reference time-frequency resource, a fourth sub-reference time-frequency resource, a fifth sub-reference time-frequency resource, and a sixth sub-reference time-frequency resource.

The first sub-reference time-frequency resource is the time-frequency resource of the PSS in the SSB, the second sub-reference time-frequency resource to the fifth sub-reference time-frequency resource are the time-frequency resource of the first PBCH in the SSB, and the sixth sub-reference time-frequency resource is a time-frequency resource of the SSS in the SSB. It can be learned that the time-frequency resource of the first PBCH in the SSB may be four time-frequency resources that are not completely the same.

The target time-frequency resources shown in FIG. 5 include a first target time-frequency resource and a second target time-frequency resource.

Table 8 shows an example of a relationship between the reference time-frequency resource and the target time-frequency resources corresponding to FIG. 5.

TABLE 8

| Information whose transmission is to be performed | Time domain resource | Frequency domain resource |
| --- | --- | --- |
| PSS | 0 | 56, 57, . . . , 182 |
| SSS | 2 | 56, 57, . . . , 182 |
| Set to 0 | 0 | 20, 21, . . . , 24 |
|  | 2 | 48, 49, . . . , 55, 183, 184, . . . , 191 |

TABLE 8-continued

| Information whose transmission is to be performed | Time domain resource | Frequency domain resource |
| --- | --- | --- |
| PBCH 1 | 1, 3 | 0, 1, . . . , 239 |
|  | 2 | 0, 1, . . . , 47, 192, 193, . . . , 239 |
| DMRS for PBCH 1 | 1, 3 | 0 + v, 4 + v, 8 + v, . . . , 236 + v |
|  | 2 | 0 + v, 4 + v, 8 + v, . . . , 44 + v |
| PBCH 2 | 0 | 0, 1, . . . , 19, 25, 26, . . . , 55 |
| DMRS for PBCH 2 | 0 | 0 + v, 4 + v, 8 + v, . . . , 36 + v, 196 + v, . . . , 236 + v |

Meanings of the items in Table 8 are the same as those in Table 6. Details are not described herein. It can be learned that, in Table 8, the time domain resource of the first target time-frequency resource is the same as the time domain resource of the first sub-reference time-frequency resource, and the frequency domain resource of the first target time-frequency resource is a frequency domain resource subset of the second sub-reference time-frequency resource. Similarly, the time domain resource of the second target time-frequency resource is the same as the time domain resource of the first sub-reference time-frequency resource, and the frequency domain resource of the second target time-frequency resource is also a frequency domain resource subset of the second sub-reference time-frequency resource.

In the foregoing technical solution, the time-frequency resource of the SSB is multiplexed as the time-frequency resource of the second PBCH. In this way, additional division into new time-frequency resources for transmitting the second PBCH can be reduced.

In the foregoing technical solution, the time domain resource of the target time-frequency resource is earlier than the time-frequency resource of the first PBCH in the reference time-frequency resource. In other words, the second terminal apparatus first receives the information carried on the second PBCH, and then receives the information carried on the first PBCH. The second terminal apparatus may first buffer information in the target time-frequency resource. For example, when the second terminal apparatus determines, based on the first indication information carried on the first PBCH, that the bandwidth of the first frequency domain resource is greater than the bandwidth supported by the second terminal apparatus, the second terminal apparatus may then parse the information in the target time-frequency resource, to obtain the information carried on the second PBCH.

Optionally, in some other embodiments, the time domain resource of the target time-frequency resource is different from the time domain resource of the reference time-frequency resource, but the frequency domain resource of the target time-frequency resource is the same as the frequency domain resource of the reference time-frequency resource. Alternatively, the time domain resource of the target time-frequency resource is opposite to the time domain resource of the reference time-frequency resource, but the frequency domain resource of the target time-frequency resource is a frequency domain resource subset of the reference time-frequency resource.

Optionally, in some other embodiments, the time domain resource of the target time-frequency resource is different from the time domain resource of the reference time-frequency resource, and the frequency domain resource of the target time-frequency resource is different from the frequency domain resource of the reference time-frequency resource. That is, the frequency domain resource of the target time-frequency resource partially overlaps the frequency domain resource of the reference time-frequency resource.

Figure 6:
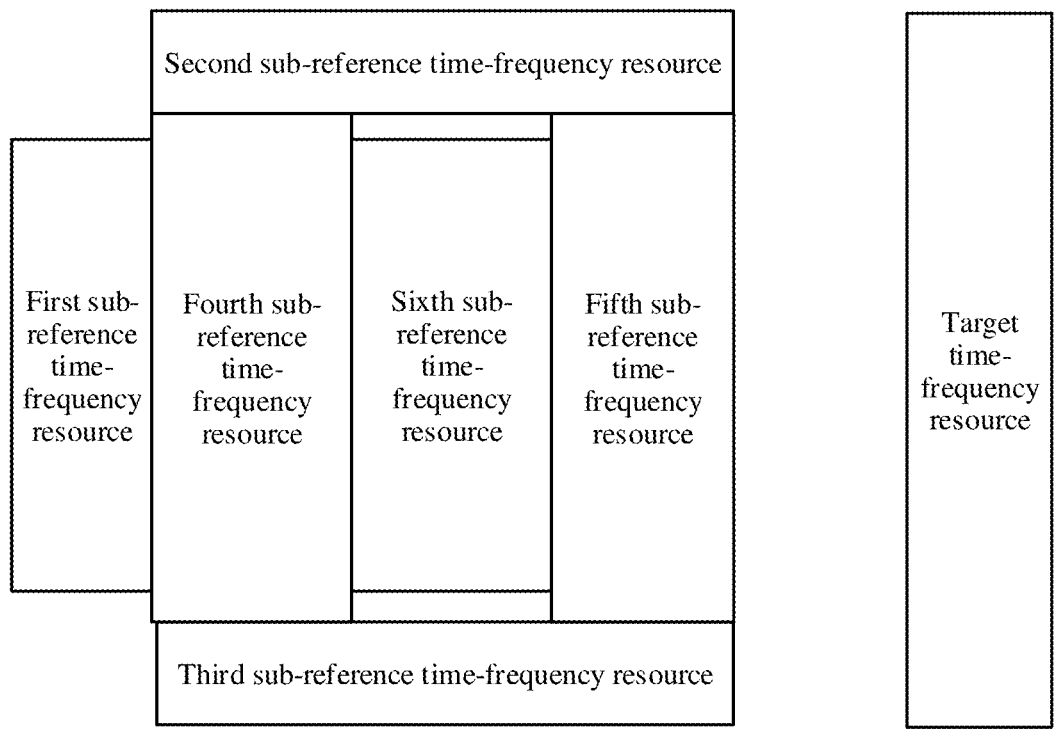
FIG. 6 shows a relationship between a target time-frequency resource and a reference time-frequency resource.

For example, FIG. 6 shows a relationship between a target time-frequency resource and a reference time-frequency resource.

Table 9 shows a relationship between the target time-frequency resource and the reference time-frequency resource corresponding to FIG. 6.

TABLE 9

| Sub-carrier spacing | SSB/PBCH 2 | OFDM symbol | $f \leq 3$ GHz | 3 GHz < $f \leq 6$ GHz | 6 GHz < f |
|---|---|---|---|---|---|
| 15 kHz | SSB | $\{2, 8\} + 14n$ | n = 0, 1 | n = 0, 1, 2, 3 | |
| | PBCH 2 | $\{6, 12\} + 14n$ | n = 0, 1 | n = 0, 1, 2, 3 | |
| 30 kHz | SSB | $\{4, 8, 16, 20\} + 28n$ | n = 0 | n = 0, 1 | |
| | PBCH 2 | $\{4, 8, 16, 20\} + 28n$ | n = 2 | n = 2, 3 | |
| 30 kHz | SSB | $\{2, 8\} + 14n$ | n = 0, 1 | n = 0, 1 | |
| | PBCH 2 | $\{6, 12\} + 14n$ | n = 0, 1 | n = 0, 1 | |
| 120 kHz | SSB | $\{4, 8, 16, 20\} + 28n$ | | | n = 0, 1, 2, 3, 5, 6, 7, 8, 10, 11, 12, 13, 15, 16, 17, 18 |
| | PBCH 2 | $\{4, 5, 6, 7\} + 28n$ | | | n = 4, 9, 14, 19 |
| 240 kHz | SSB | $\{8, 12, 16, 20, 32, 36, 40, 44\} + 56n$ | | | n = 0, 1, 2, 3, 5, 6, 7, 8 |
| | PBCH 2 | $\{8, 12, 16, 20, 32, 36, 40, 44\} + 56n$ | | | n = 9, 10, 11, 12, 14, 15, 16, 17 | n in Table 9 identifies a slot number in a frame, and the slot number starts from 0.

Figure 9:
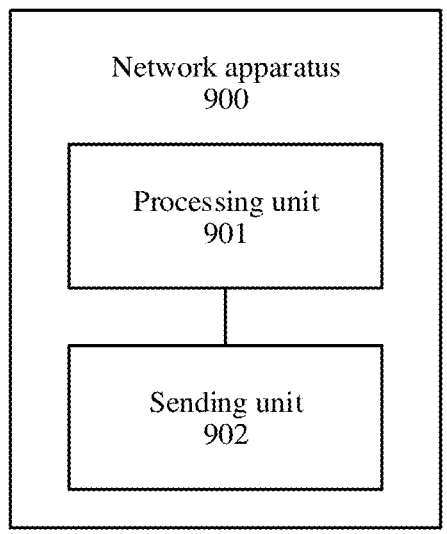
FIG. 9 is a block diagram of a structure of a network apparatus according to an embodiment of this application.

As shown in FIG. 9, a frequency domain resource of the target time-frequency resource is the same as a frequency domain resource of the reference time-frequency resource. Therefore, Table 9 shows only a relationship between a time domain resource of the target time-frequency resource and a time domain resource of the reference time-frequency resource. As shown in Table 5, when the subcarrier spacing is 15 kHz, a start position of an OFDM symbol used for transmission of the SSB is a $(2+14 \times n)^{th}$ OFDM symbol or an $(8+14 \times n)^{th}$ OFDM symbol. When a carrier frequency is less than or equal to 3 GHz, a value of n is 0 or 1. When the carrier frequency is greater than 3 GHz and less than or equal to 6 GHz, the value of n is 0, 1, 2, or 3. A start position of an OFDM symbol of the second PBCH is a $(6+14 \times n)^{th}$ OFDM symbol or a $(12+14 \times n)^{th}$ OFDM symbol. When a carrier frequency is less than or equal to 3 GHz, a value of n is 0 or 1. When the carrier frequency is greater than 3 GHz and less than or equal to 6 GHz, the value of n is 0, 1, 2, or 3. It can be learned that, when the subcarrier spacing is 15 kHz, although value ranges of n corresponding to the SSB and the PBCH 2 are the same, values in the OFDM symbol column are different. Therefore, when the subcarrier spacing is 15 kHz, time domain resources of the SSB and the second PBCH are different. For another example, when the subcarrier spacing is 240 kHz, values in the OFDM symbol column corresponding to the SSB and the PHCH 2 are the same, but value ranges of n are different. Therefore, when the subcarrier spacing is 240 kHz, time domain resources of the SSB and the second PBCH are different.

Optionally, in some embodiments, a transmission periodicity of the second PBCH is the same as a transmission periodicity of the SSB, and the time domain resource of the target time-frequency resource and the time domain resource of the reference time-frequency resource are located in a same time unit. Optionally, in some embodiments, the time unit may be a half frame. For another example, in some other embodiments, the time unit may be a preset quantity of OFDM symbols.

Optionally, in some embodiments, the frequency domain resource used for transmission of the second downlink control information and/or the second system information may be the same as a frequency domain resource of a second initial active (initial active) downlink (downlink, DL) bandwidth part (bandwidth part, BWP). In other words, the second frequency domain resource may be the same as the frequency domain resource of the second initial active downlink BWP. In this case, the second indication information may be further used to indicate the frequency domain resource of the second initial active downlink BWP. In other words, the frequency domain resource of the second initial active downlink BWP is indicated by using the second indication information.

Optionally, in some embodiments, the second initial active downlink BWP may also be referred to as another downlink BWP.

205: The network apparatus may send the second downlink control information and/or the second system information to the second terminal apparatus on the second frequency domain resource. Correspondingly, the second terminal apparatus may receive, on the second frequency domain resource, the second downlink control information and/or the second system information sent by the network apparatus.

An implementation in which the network apparatus sends the second system information and/or the second downlink control information to the second terminal apparatus is the same as the implementation in which the network device sends the first system information and/or the first downlink control information to the first terminal apparatus. For brevity, details are not described herein.

An implementation in which the second terminal apparatus receives the second system information and/or the second downlink control information sent by the network apparatus is the same as the implementation in which the first terminal apparatus receives the first system information and/or the first downlink control information sent by the network apparatus. For brevity, details are not described herein.

By using the method shown in FIG. 2, the narrowband terminal apparatus may obtain downlink control information (for example, PDCCH information) and system information (for example, RMSI) within a capability range. Therefore, in the foregoing technical solution, terminal apparatuses with different capabilities all can receive downlink control information (for example, PDCCH information) and system information (for example, RMSI).

Figure 3:
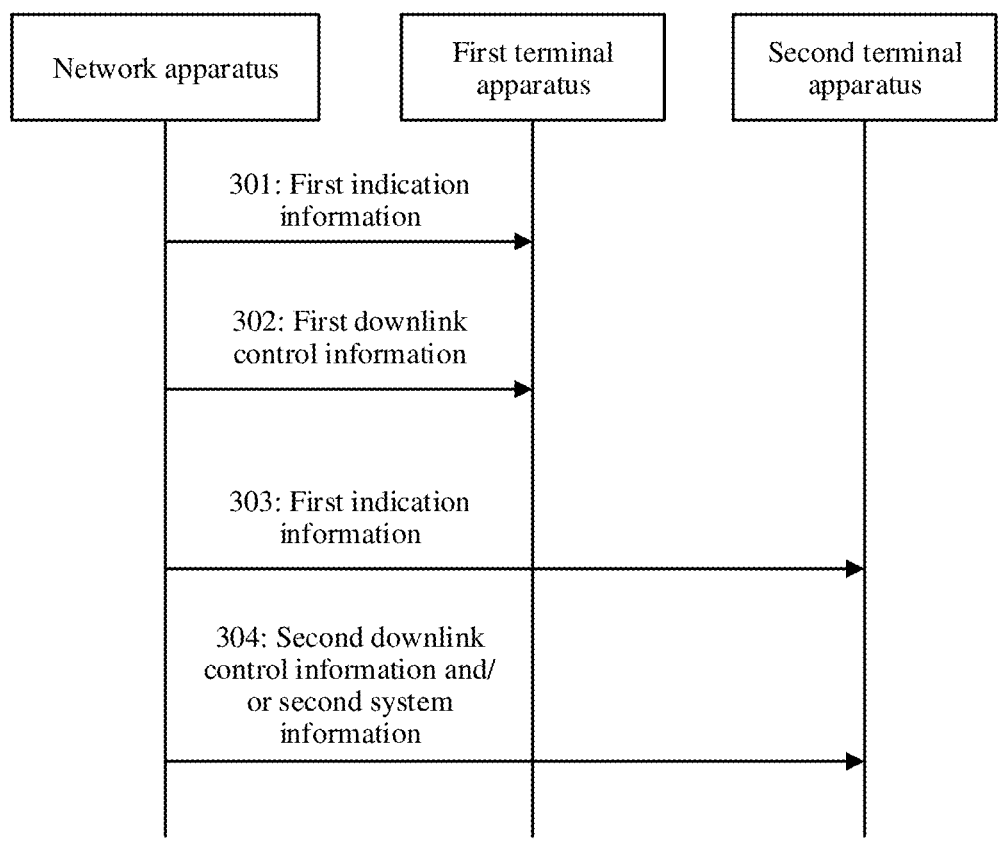
FIG. 3 is a schematic flowchart of another communication method according to an embodiment of this application.

FIG. 3 is a schematic flowchart of another communication method according to an embodiment of this application. The method shown in FIG. 3 may be used in the system 100 shown in FIG. 1.

301: A network apparatus sends first indication information to a first terminal apparatus, where the first indication information is carried on a first PBCH. Correspondingly, the first terminal apparatus receives the first indication information from the network apparatus. The first indication information indicates a first frequency domain resource, the first frequency domain resource is used for transmission of first downlink control information and/or first system information, and the first downlink control information is used to schedule the first system information.

302: The network apparatus may send the first downlink control information to the first terminal apparatus on the first frequency domain resource. Correspondingly, the first terminal apparatus may receive, on the first frequency domain resource, the first downlink control information sent by the network apparatus. The first downlink control information is used to schedule the first system information.

The network device sends the first system information to the first terminal apparatus on the first frequency domain resource.

303: The network apparatus may send the first indication information to a second terminal apparatus. Correspondingly, the second terminal apparatus may receive the first indication information from the network apparatus.

A specific implementation of step 301 is the same as a specific implementation of step 201, a specific implementation of step 302 is the same as a specific implementation of step 202, and a specific implementation of step 303 is the same as a specific implementation of step 203. For brevity, details are not described herein.

A manner in which the network device sends the downlink control information and/or the system information may be preconfigured. For example, in some embodiments, the network device is preconfigured to send the system information and/or the downlink control information only on one frequency domain resource. In this case, the network device does not need to perform step 304.

Optionally, in some other embodiments, the network apparatus may always perform step 304. For example, the network device may be preconfigured to send the system information and/or the downlink control information on at least two frequency domain resources. It may be understood that, in the preconfiguration, the system information and/or the downlink control information may be sent on the at least two frequency domain resources, a bandwidth size of each frequency domain resource may be further configured. Bandwidth sizes of any two of the at least two frequency domain resources may be the same or may be different. It is assumed that the first frequency domain resource and a second frequency domain resource are two of the at least two frequency domain resources. In some embodiments, a bandwidth size of the first frequency domain resource may be the same as a bandwidth size of the second frequency domain resource. In some other embodiments, a bandwidth size of the first frequency domain resource may be different from a bandwidth size of the second frequency domain resource. When the bandwidth size of the first frequency domain resource is the same as the bandwidth size of the second frequency domain resource, a frequency domain range of the first frequency domain resource is different from a frequency domain range of the second frequency domain resource. That the frequency domain range of the first frequency domain resource is different from the frequency domain range of the second frequency domain resource may mean that the frequency domain range of the first frequency domain resource is completely different from the frequency domain range of the second frequency domain resource (that is, there is no intersection set between the first frequency domain resource and the second frequency domain resource in frequency domain), or may mean that the frequency domain range of the first frequency domain resource is not completely the same as the frequency domain range of the second frequency domain resource (that is, there is an intersection set between the first frequency domain resource and the second frequency domain resource in frequency domain).

Optionally, in some embodiments, the terminal apparatus may choose to receive the first downlink control information and/or the first system information on the first frequency domain resource, or receive second downlink control information and/or second system information on the second frequency domain resource based on the bandwidth of the frequency domain resource indicated by the first indication information. For example, if the bandwidth size supported by the terminal apparatus is less than the bandwidth size of the first frequency domain resource, the terminal apparatus may receive the second downlink control information and/or the second system information from the network apparatus on the second frequency domain resource. In other words, if the bandwidth size supported by the terminal apparatus is less than the bandwidth size of the first frequency domain resource, the terminal apparatus may perform step 304 (that is, the terminal apparatus is equivalent to the second terminal apparatus). For example, if the bandwidth size supported by the terminal apparatus is greater than the bandwidth size of the first frequency domain resource, the terminal apparatus may receive the first downlink control information and/or the first system information from the network apparatus on the first frequency domain resource. In other words, if the bandwidth size supported by the terminal apparatus is less than the bandwidth size of the first frequency domain resource, the terminal apparatus is equivalent to the first terminal apparatus that performs step 301 and step 302.

Optionally, in some embodiments, the terminal apparatus may choose to receive the first downlink control information and/or the first system information on the first frequency domain resource, or receive the second downlink control information and/or the second system information on the second frequency domain resource according to a preset rule. For example, based on identification information (for example, an international mobile subscriber identification identity (International Mobile Subscriber Identification Number, IMSI), an international mobile equipment identity (International Mobile Equipment Identity, IMEI), a media access control (Media Access Control, MAC) address, and the like) of the terminal apparatus, the terminal apparatus may select the frequency domain resource used to receive the downlink control information and/or the system information, and receive the downlink control information and/or the system information on the corresponding frequency domain resource.

Optionally, in some other embodiments, the terminal apparatus may select, based on time of accessing the network apparatus, the frequency domain resource used to receive the downlink control information.

Optionally, in some other embodiments, the network apparatus may indicate a specific frequency domain resource on which the terminal apparatus receives the downlink control information.

304: The network apparatus may send the second downlink control information and/or the second system information to the second terminal apparatus on the second frequency domain resource. Correspondingly, the second terminal apparatus may receive the second downlink control information and/or the second system information on the second frequency domain resource.

The second frequency domain resource is a predefined or configured frequency domain resource. Alternatively, the second frequency domain resource is one of a plurality of frequency domain resources, and the plurality of frequency domain resources are one of predefined or configured frequency domain resources.

Because the second frequency domain resource is predefined or configured, the network apparatus does not need to notify the terminal apparatus by using signaling. This helps reduce signaling resource overheads. A plurality of second frequency domain resources are predefined, so that a plurality of terminal apparatuses in a cell can evenly use the plurality of second frequency domain resources. This helps reduce load on each second frequency domain resource.

The predefined frequency domain resource is a frequency domain resource prestored in the second terminal apparatus. In other words, before the second terminal apparatus accesses the network apparatus, the terminal apparatus already stores one or more frequency domain resources that may be used to receive the second downlink control information.

The configured frequency domain resource is a frequency domain resource configured by the network apparatus for the second terminal apparatus. In other words, before the second terminal apparatus accesses the network apparatus, the terminal apparatus does not store one or more frequency domain resources that may be used to receive the second downlink control information. The frequency domain resource used to receive the second downlink control information is sent by the network apparatus to the second terminal apparatus. In other words, the network apparatus may store at least one frequency domain resource, and the network apparatus may select the at least one frequency domain resource, and notify the second terminal apparatus of one or more of the at least one frequency domain resource. The frequency domain resource notified to the second terminal apparatus is a frequency domain resource that may be used for transmission of the second downlink control information.

In other words, the network apparatus may store N different frequency domain resources, and N is a positive integer greater than or equal to 1.

Optionally, in some embodiments, that the network apparatus configures the frequency domain resource for the second terminal apparatus may include: The network apparatus may select one frequency domain resource from the N frequency domain resources; and indicate the frequency domain resource to the second terminal apparatus by using indication information. The frequency domain resource is the second frequency domain resource. The network apparatus may configure the frequency domain resource for the second terminal apparatus through a PBCH. A specific configuration manner is the same as the implementation in which the network apparatus sends the second indication information to the second terminal apparatus through the second PBCH in the embodiment shown in FIG. 2. Details are not described herein. In other words, the embodiment shown in FIG. 2 may also be understood as that the second frequency domain resource is configured by the network apparatus, and the network apparatus configures only one frequency domain resource.

Optionally, in some other embodiments, that the network apparatus configures the frequency domain resource for the second terminal apparatus may include: The network apparatus may select at least two frequency domain resources from the N frequency domain resources (where N is a positive integer greater than or equal to 2); and indicate the at least two frequency domain resources to the second terminal apparatus by using indication information. The second frequency domain resource is one of the at least two frequency domain resources. After receiving the at least two frequency domain resources, the second terminal apparatus may store the at least two frequency domain resources. The network apparatus may configure the at least two frequency domain resources for the second terminal apparatus through a PBCH. A specific configuration manner is the same as the implementation in which the network apparatus sends the second indication information to the second terminal apparatus through the second PBCH in the embodiment shown in FIG. 2. Details are not described herein.

Optionally, in some embodiments, when a plurality of frequency domain resources are predefined or configured, the network apparatus and the second terminal apparatus may determine the second frequency domain resource from the plurality of frequency domain resources according to a predefined rule. It may be understood that the network apparatus and the second terminal apparatus need to follow a same rule, so that frequency domain resources selected by the network apparatus and the second terminal apparatus are same frequency domain resources.

Optionally, in some other embodiments, when there are a plurality of predefined or configured frequency domain resources, the network apparatus may determine the second frequency domain resource, and the second terminal apparatus may blindly detect the second frequency domain resource from the plurality of frequency domain resources.

An implementation in which the second terminal apparatus receives the second system information and/or the second downlink control information sent by the network apparatus is the same as the implementation in which the first terminal apparatus receives the first system information and/or the first downlink control information sent by the network apparatus. For brevity, details are not described herein.

It can be learned that, compared with the method shown in FIG. 3, a difference between the method shown in FIG. 2 and the method shown in FIG. 3 lies in that: In the method shown in FIG. 2, the second frequency domain resource is notified to the second terminal apparatus by the network apparatus before the network apparatus sends the second downlink control information and/or the second system information to the second terminal apparatus, and the second terminal apparatus receives the second downlink control information and the second system information based on the second frequency domain resource notified by the network apparatus. In the method shown in FIG. 3, the second frequency domain resource is preset. When determining a corresponding condition is satisfied (for example, a bandwidth of the first frequency domain resource is greater than a bandwidth supported by the second terminal apparatus), the network apparatus may send the second downlink control information and the second system information to the second terminal apparatus on the second frequency domain resource. Correspondingly, when determining that a corresponding condition is satisfied (for example, the bandwidth supported by the second terminal apparatus is less than the bandwidth of the first frequency domain resource), the second terminal apparatus may also independently determine the second frequency domain resource, receive the second downlink control information sent by the network apparatus on the second frequency domain resource, and receive the second system information based on the second downlink control information.

Optionally, in some embodiments, a form of the predefined or configured frequency domain resource may be at least one narrowband CORESET configuration table shown in Table 4. The second terminal apparatus may first select one narrowband CORESET configuration table from a plurality of narrowband CORESET configuration tables based on a subcarrier spacing and a minimum channel bandwidth, and then determine the second frequency domain resource in the narrowband CORESET configuration table. Optionally, in some embodiments, in addition to the predefined or configured frequency domain resource, the second terminal apparatus may further predefine or configure a time domain resource. A form of the predefined or configured time domain resource may be at least one narrowband monitoring occasion configuration table shown in Table 5. The second terminal apparatus may first select one narrowband monitoring occasion configuration table from a plurality of narrowband monitoring occasion configuration tables based on a CORESET multiplexing pattern and/or a frequency range (frequency range, FR), and then determine a system frame number and a slot number in the narrowband monitoring occasion configuration table. After determining the system frame number and the slot number, the second terminal apparatus may monitor the second PDCCH in two consecutive slots starting from the slot number.

Optionally, in some embodiments, the network apparatus and the second terminal apparatus may store the narrowband CORESET configuration table shown in Table 4. For example, the narrowband CORESET configuration table shown in Table 4 may be prestored in the network apparatus and the second terminal apparatus. For another example, the narrowband CORESET configuration table shown in Table 4 may be prestored in the network apparatus, and the network apparatus may send the narrowband CORESET configuration table to the second terminal apparatus. Optionally, in some embodiments, the network apparatus and the second terminal apparatus may negotiate in advance a frequency domain resource (namely, the second frequency domain resource) used for transmission of the second downlink control information and the second system information. For example, the network apparatus and the second terminal apparatus may negotiate to use a configuration in the first row of the narrowband CORESET configuration table shown in Table 4 as the second frequency domain resource. Optionally, in some other embodiments, the network apparatus may independently determine the second frequency domain resource, and the second terminal apparatus may determine the second frequency domain resource based on the stored narrowband CORESET configuration table and according to a preset rule, and receive the second downlink control information on the second frequency domain resource; or blindly detect the second downlink control information, and receive the second system information based on the second downlink control information.

As described above, the narrowband CORESET configuration table shown in Table 4 may be used not only to indicate the frequency domain resource, but also to indicate a time domain symbol used for transmission of the downlink control information. Therefore, the second terminal apparatus may further determine, based on the narrowband CORESET configuration table shown in Table 4, the time domain symbol used for transmission of the second downlink control information.

Optionally, in some other embodiments, the terminal apparatus and/or the network apparatus may store narrowband CORESET configuration information by using the narrowband CORESET configuration table shown in Table 4, the terminal apparatus and/or the network apparatus may alternatively store the narrowband CORESET configuration information in another form, for example, may store at least one candidate quantity of RBs.

Optionally, in some embodiments, the network apparatus and the second terminal apparatus may store the monitoring occasion configuration table shown in Table 5. For example, the monitoring occasion configuration table shown in Table 5 may be prestored in the network apparatus and the second terminal apparatus. For another example, the monitoring occasion configuration table shown in Table 5 may be prestored in the network apparatus, and the network apparatus may send the monitoring occasion configuration table to the second terminal apparatus. Optionally, in some embodiments, the network apparatus and the second terminal apparatus may negotiate in advance a frequency domain resource (namely, the second frequency domain resource) used for transmission of the second downlink control information and the second system information. For example, the network apparatus and the second terminal apparatus may negotiate to use a configuration in the first row of the monitoring occasion configuration table shown in Table 5 as the time domain resource used for transmission of the second downlink control information (more specifically, a system frame number and a slot number that are used for transmission of the second downlink control information). Optionally, in some other embodiments, the network apparatus may independently determine the time domain resource used for transmission of the second downlink control information, and the second terminal apparatus may determine, based on the stored monitoring occasion table and according to a preset rule, the time domain resource used for transmission of the second downlink control information, and receive the second downlink control information on the time domain resource used for transmission of the second downlink control information; or blindly detect the second downlink control information, and receive the second system information based on the second downlink control information.

Optionally, in some other embodiments, the terminal apparatus and/or the network apparatus may store narrowband monitoring occasion configuration information by using the monitoring occasion configuration table shown in Table 5, the terminal apparatus and/or the network apparatus may alternatively store the narrowband monitoring occasion configuration information in another form, for example, may store at least one candidate value of 0 and at least one candidate value of M.

Figure 7:
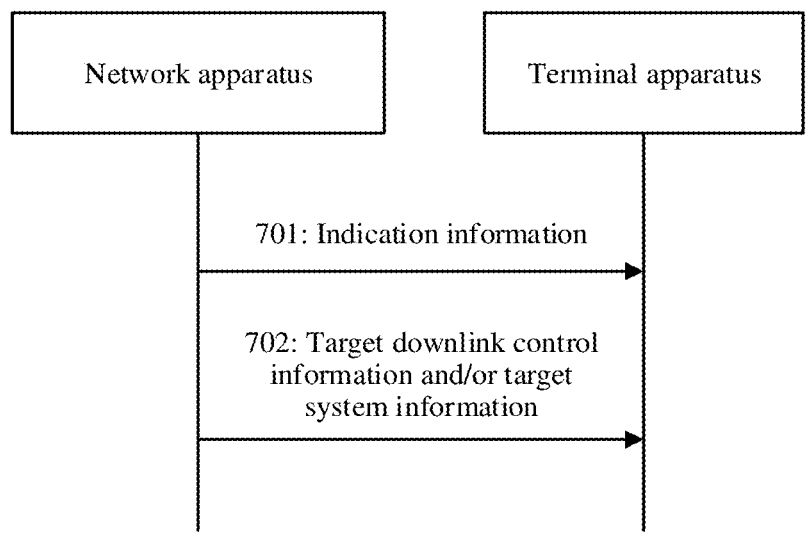
FIG. 7 is a schematic flowchart of another communication method according to an embodiment of this application.

FIG. 7 is a schematic flowchart of another communication method according to an embodiment of this application. The method shown in FIG. 7 may be applied to the system shown in FIG. 1.

701: A terminal apparatus receives indication information from a network apparatus, where the indication information is used to indicate a frequency domain resource, and the frequency domain resource is used for transmission of downlink control information and/or system information.

702: The terminal apparatus receives target downlink control information and/or target system information from the network apparatus on a target frequency domain resource.

Optionally, in some embodiments, the terminal apparatus may be the first terminal apparatus in the embodiment shown in FIG. 2 or FIG. 3. In this case, the target frequency domain resource is the first frequency domain resource in the embodiment shown in FIG. 2 or FIG. 3. Correspondingly, the target downlink control information is the first downlink control information, and the target system information is the first system information. For a specific implementation in which the terminal apparatus receives the target downlink control information and/or the target system information, refer to descriptions in the embodiment shown in FIG. 2 or FIG. 3. Details are not described herein.

Optionally, in some other embodiments, the terminal apparatus may be the second terminal apparatus in the embodiment shown in FIG. 2 or FIG. 3. In this case, the target frequency domain resource is the second frequency domain resource in the embodiment shown in FIG. 2 or FIG. 3. Correspondingly, the target downlink control information is the second downlink control information, and the target system information is the second system information. For a specific implementation in which the terminal apparatus receives the target downlink control information and/or the target system information, refer to descriptions in the embodiment shown in FIG. 2 or FIG. 3. Details are not described herein.

For example, in some possible implementations, before step 701, the terminal apparatus may first receive first indication information sent by the network apparatus; and determine a bandwidth size of the first frequency domain resource based on the first indication information. Further, optionally, when the bandwidth size of the first frequency domain resource is greater than a bandwidth size supported by the terminal apparatus, second downlink control information and/or second system information are received on the frequency domain resource indicated by the indication information (where the indication information is equivalent to the second indication information in the embodiment shown in FIG. 2) received in step 701.

For another example, in some other possible implementations, when the bandwidth size of the frequency domain resource indicated by the indication information (where the indication information is equivalent to the first indication information in the embodiment shown in FIG. 3) received in step 701 is greater than the bandwidth size supported by the terminal apparatus, the terminal apparatus may receive second downlink control information and/or second system information on a predefined or configured frequency domain resource.

For a specific implementation in which the terminal apparatus receives the target system information and/or the target downlink control information, refer to the embodiment shown in FIG. 2 or FIG. 3. For brevity, details are not described herein again.

The following describes structures of related products. It should be noted that the terminal apparatus in the following descriptions may be a terminal device itself, or may be a component, for example, a chip or an integrated circuit, in the terminal device. The network apparatus in the following descriptions may be a network device itself, or may be a component, for example, a chip or an integrated circuit, in the network device.

Figure 8:
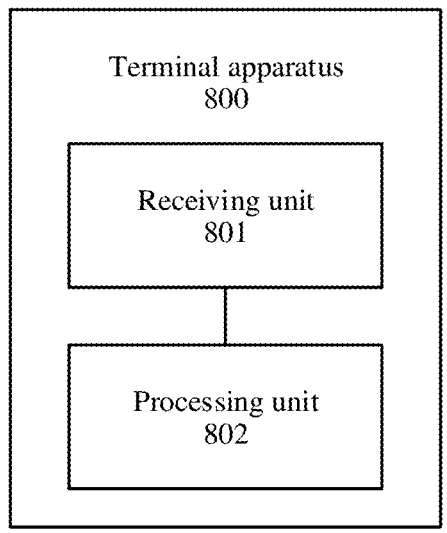
FIG. 8 is a block diagram of a structure of a terminal apparatus according to an embodiment of this application.

FIG. 8 is a block diagram of a structure of a terminal apparatus according to an embodiment of this application. The terminal apparatus shown in FIG. 8 includes a receiving unit 801 and a processing unit 802.

The receiving unit 801 is configured to receive first indication information from a network apparatus, where the first indication information is carried on a first physical broadcast channel PBCH, the first indication information indicates a first frequency domain resource, the first frequency domain resource is used for transmission of first downlink control information, and the first downlink control information is used to schedule first system information.

The receiving unit 801 is further configured to receive target system information and/or target downlink control information from the network apparatus on a target frequency domain resource, where a bandwidth of the target frequency domain resource is less than or equal to a bandwidth size supported by the terminal apparatus, and the target downlink control information is used to schedule the target system information.

The processing unit 802 is configured to process the target system information and/or the target downlink control information received by the receiving unit 801. For example, the processing unit 802 may determine, based on the target downlink control information, a frequency domain resource and/or a time domain resource used to receive the target system information. For another example, the processing unit 802 may obtain, from the target system information, information carried in the target system information.

Optionally, in some embodiments, a bandwidth size of the first frequency domain resource is greater than the bandwidth size supported by the terminal apparatus, the target frequency domain resource is a second frequency domain resource, and the second frequency domain resource is different from the first frequency domain resource; and the receiving unit 801 is configured to receive second system information and/or second downlink control information from the network apparatus on the second frequency domain resource, where the second downlink control information is used to schedule the second system information.

Optionally, in some embodiments, a bandwidth size of the first frequency domain resource is less than or equal to the bandwidth size supported by the terminal apparatus, and the target frequency domain resource is the first frequency domain resource; and the receiving unit 801 is configured to receive, on the first frequency domain resource, the first downlink control information and/or the first system information sent by the network apparatus.

Optionally, in some embodiments, the first frequency domain resource is the same as a frequency domain resource of a first initial active downlink bandwidth part BWP; and/or the second frequency domain resource is the same as a frequency domain resource of a second initial active downlink BWP.

Optionally, in some embodiments, the receiving unit 801 is further configured to receive second indication information from the network apparatus, where the second indication information is carried on a second PBCH, and the second indication information is used to indicate the second frequency domain resource.

Optionally, in some embodiments, the second frequency domain resource is predefined or configured; or the second frequency domain resource is one of a plurality of frequency domain resources, and the plurality of frequency domain resources are predefined or configured.

Optionally, in some embodiments, the first PBCH is located in a synchronization broadcast channel block SSB, and the SSB further carries a primary synchronization signal PSS and a secondary synchronization signal SSS, where a time domain resource of the second PBCH is the same as a time domain resource of the PSS, and a frequency domain resource of the second PBCH is a frequency domain resource subset of the SSB and does not overlap a frequency domain resource of the PSS.

Optionally, in some embodiments, the first PBCH is located in an SSB, and the SSB further carries a PSS and an SSS, where a time domain resource of the second PBCH is different from a time domain resource of the SSB, and a frequency domain resource of the second PBCH is the same as a frequency domain resource of the SSB; or a time domain resource of the second PBCH is different from a time domain resource of the SSB, and a frequency domain resource of the second PBCH is a frequency domain resource subset of the SSB.

Optionally, in some embodiments, a transmission periodicity of the second PBCH is the same as a transmission periodicity of the SSB, and the time domain resource of the second PBCH and the time domain resource of the SSB are located in a same time unit.

Optionally, in some embodiments, the first indication information is indication information of a control resource set for a first physical downlink control channel PDCCH common search space set, and the control resource set for the first PDCCH common search space set is used to monitor the first downlink control information; and the second indication information is indication information of a control resource set for a second PDCCH common search space set, and the control resource set for the second PDCCH common search space set is used to monitor the second downlink control information.

The receiving unit 801 may be configured to perform the receiving step of the terminal apparatus in the embodiments shown in FIG. 2, FIG. 3, and FIG. 7. For example, the terminal apparatus 800 may be the first terminal apparatus in the embodiment shown in FIG. 2. In this case, the receiving unit 801 may be configured to perform the receiving operation of the first terminal apparatus in step 201 and step 202 shown in FIG. 2. For another example, the terminal device 800 may be the second terminal apparatus in the embodiment shown in FIG. 2. In this case, the receiving unit 801 may perform the receiving operation of the second terminal apparatus in step 203, step 204, and step 205 shown in FIG. 2.

The receiving unit 801 may be implemented by a receiver, and the processing unit 802 may be implemented by a processor.

FIG. 9 is a block diagram of a structure of a network apparatus according to an embodiment of this application. The network apparatus 900 shown in FIG. 9 includes a processing unit 901 and a sending unit 902.

The processing unit 901 is configured to determine first indication information. A manner of determining the first indication information may be consistent with an existing manner of determining indication information and downlink control information. For brevity, details are not described.

The sending unit 902 is configured to send the first indication information, where the first indication information is carried on a first physical broadcast channel PBCH, the first indication information indicates a first frequency domain resource, the first frequency domain resource is used for transmission of first downlink control information and/or first system information, and the first downlink control information is used to schedule the first system information.

The sending unit 902 is further configured to send the first downlink control information on the first frequency domain resource.

The sending unit 902 is further configured to send second downlink control information and/or second system information on a second frequency domain resource, where the first frequency domain resource is different from the second frequency domain resource.

Optionally, in some embodiments, the first frequency domain resource is the same as a frequency domain resource of a first initial active downlink bandwidth part BWP; and/or the second frequency domain resource is the same as a frequency domain resource of a second initial active downlink BWP.

Optionally, in some embodiments, the sending unit 902 is further configured to send second indication information, where the second indication information is carried on a second PBCH, and the second indication information is used to indicate the second frequency domain resource.

Optionally, in some embodiments, the second frequency domain resource is predefined or configured; or the second frequency domain resource is one of a plurality of frequency domain resources, and the plurality of frequency domain resources are predefined or configured.

Optionally, in some embodiments, the first PBCH is located in a synchronization broadcast channel block SSB, and the SSB further carries a primary synchronization signal PSS and a secondary synchronization signal SSS, where a time domain resource of the second PBCH is the same as a time domain resource of the PSS, and a frequency domain resource of the second PBCH is a frequency domain resource subset of the SSB and does not overlap a frequency domain resource of the PSS.

Optionally, in some embodiments, the first PBCH is located in an SSB, and the SSB further carries a PSS and an SSS, where a time domain resource of the second PBCH is different from a time domain resource of the SSB, and a frequency domain resource of the second PBCH is the same as a frequency domain resource of the SSB; or a time domain resource of the second PBCH is different from a time domain resource of the SSB, and a frequency domain resource of the second PBCH is a frequency domain resource subset of the SSB.

Optionally, in some embodiments, a transmission periodicity of the second PBCH is the same as a transmission periodicity of the SSB, and the time domain resource of the second PBCH and the time domain resource of the SSB are located in a same time unit.

Optionally, in some embodiments, the first indication information is indication information of a control resource set for a first physical downlink control channel PDCCH common search space set, and the control resource set for the first PDCCH common search space set is used to monitor the first downlink control information; and the second indication information is indication information of a control resource set for a second PDCCH common search space set, and the control resource set for the second PDCCH common search space set is used to monitor the second downlink control information.

The sending unit 902 may be configured to perform the sending step of the network apparatus in the embodiments shown in FIG. 2, FIG. 3, and FIG. 7. For example, the sending unit 902 may be configured to perform the sending operation of the network apparatus in step 201 and step 202 shown in FIG. 2.

The processing unit 901 may be implemented by a processor, and the sending unit 902 may be implemented by a transmitter.

Figure 10:
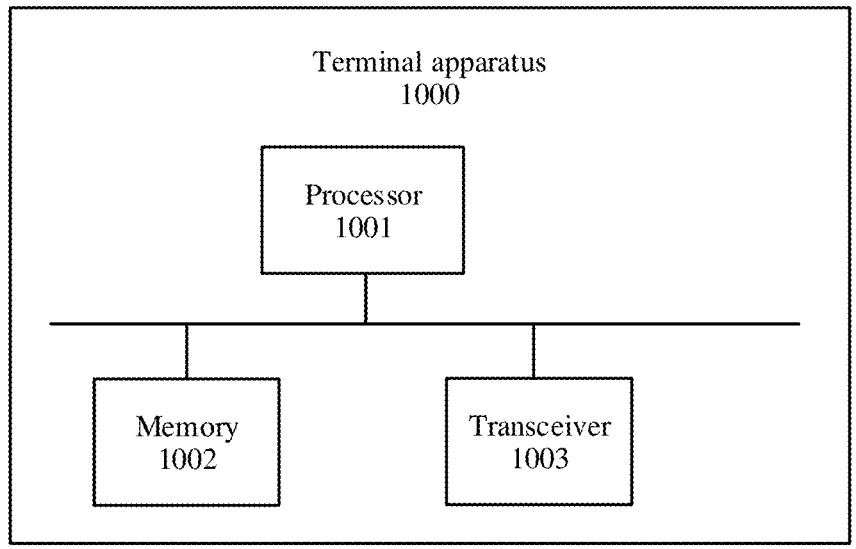
FIG. 10 is a block diagram of a structure of a terminal apparatus according to an embodiment of this application.

FIG. 10 is a block diagram of a structure of a terminal apparatus according to an embodiment of this application. The terminal apparatus 100 shown in FIG. 10 includes a processor 1001, a memory 1002, a radio frequency circuit, an antenna, and an input/output apparatus. The processor 1001 may be configured to: process a communication protocol and communication data, and control the terminal apparatus to execute a software program, process data of the software program, and the like. The memory 1002 is mainly configured to store the software program and data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data input by a user, and output data to the user. It should be noted that some types of terminal apparatuses may not have an input/output apparatus.

When data needs to be sent, after performing baseband processing on the to-be-sent data, the processor 1001 outputs a baseband signal to the radio frequency circuit. The radio frequency circuit performs radio frequency processing on the baseband signal and then sends the radio frequency signal to the outside in a form of an electromagnetic wave through the antenna. When data is sent to the terminal, the radio frequency circuit receives the radio frequency signal through the antenna, converts the radio frequency signal into the baseband signal, and outputs the baseband signal to the processor. The processor converts the baseband signal into data, and processes the data. For ease of description, only one memory and one processor are shown in FIG. 10. In an actual terminal apparatus product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver 1003 of the terminal, and the processor that has a processing function may be considered as a processing unit of the terminal. The transceiver may also be referred to as a transceiver unit, a transceiver machine, a transceiver apparatus, or the like. The processing unit may also be referred to as a processor, a processing board, a processing module, a processing apparatus, or the like. Optionally, a component that is in the transceiver 1003 and that is configured to implement a receiving function may be considered as a receiving unit, and a component that is in the transceiver 1003 and that is configured to implement a sending function may be considered as a sending unit. In other words, the transceiver 1003 includes the receiving unit and the sending unit. The receiving unit sometimes may also be referred to as a receiver machine, a receiver, a receiver circuit, or the like. The sending unit sometimes may also be referred to as a transmitter machine, a transmitter, a transmitter circuit, or the like.

The processor 1001, the memory 1002, and the transceiver 1003 communicate with each other through an internal connection path, to transfer a control and/or data signal.

The methods disclosed in the foregoing embodiments of this application may be applied to the processor 1001 or implemented by the processor 1001. The processor 1001 may be an integrated circuit chip and has a signal processing capability. In an implementation process, steps in the foregoing methods can be implemented by using a hardware integrated logic circuit in the processor 1001, or by using instructions in a form of software.

The processor in the embodiments of this application may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by means of a hardware decoding processor, or may be performed and completed by using a combination of hardware and software modules in the decoding processor. The software module may be located in a mature storage medium in the art, such as a random access memory (random access memory, RAM), a flash memory, a read-only memory (read-only memory, ROM), a programmable read-only memory, an electrically erasable programmable memory, or a register. The storage medium is located in the memory, and the processor reads instructions in the memory and completes the steps of the foregoing methods in combination with hardware of the processor.

Optionally, in some embodiments, the memory 1002 may store instructions used to perform the method performed by the terminal apparatus, for example, the second terminal apparatus, in the method shown in FIG. 2. The processor 1001 may execute the instructions stored in the memory 1002 and complete, in combination with other hardware (for example, the transceiver 1003), the steps performed by the terminal apparatus, for example, the second terminal apparatus, in the method shown in FIG. 2. For a specific working process and beneficial effects, refer to the descriptions in the embodiment shown in FIG. 2.

Optionally, in some embodiments, the memory 1002 may store instructions used to perform the method performed by the terminal apparatus, for example, the second terminal apparatus, in the method shown in FIG. 3. The processor 1001 may execute the instructions stored in the memory 1002 and complete, in combination with other hardware (for example, the transceiver 1003), the steps performed by the terminal apparatus, for example, the second terminal apparatus, in the method shown in FIG. 3. For a specific working process and beneficial effects, refer to the descriptions in the embodiment shown in FIG. 3.

Optionally, in some embodiments, the memory 1002 may store instructions used to perform the method performed by the terminal apparatus in the method shown in FIG. 7. The processor 1001 may execute the instructions stored in the memory 1002 and complete, in combination with other hardware (for example, the transceiver 1003), the steps performed by the terminal apparatus in the method shown in FIG. 7. For a specific working process and beneficial effects, refer to the descriptions in the embodiment shown in FIG. 7.

Figure 11:
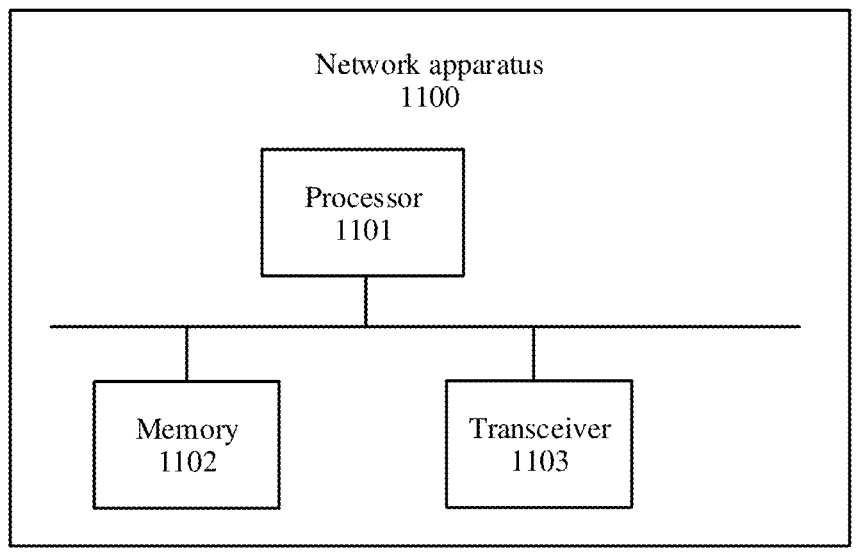
FIG. 11 is a block diagram of a structure of a network apparatus according to an embodiment of this application.

FIG. 11 is a block diagram of a structure of a network apparatus according to an embodiment of this application. The network apparatus 1100 shown in FIG. 11 includes a processor 1101, a memory 1102, and a transceiver 1103 that communicate with each other through an internal connection path, to transfer a control and/or data signal.

The methods disclosed in the foregoing embodiments of this application may be applied to the processor 1101 or implemented by the processor 1101. The processor 1101 may be an integrated circuit chip and has a signal processing capability. In an implementation process, steps in the foregoing methods can be implemented by using a hardware integrated logic circuit in the processor 1101, or by using instructions in a form of software. The foregoing processor 1101 may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by means of a hardware decoding processor, or may be performed and completed by using a combination of hardware and software modules in the decoding processor. The software module may be located in a mature storage medium in the art, such as a random access memory (random access memory, RAM), a flash memory, a read-only memory (read-only memory, ROM), a programmable read-only memory, an electrically erasable programmable memory, or a register. The storage medium is located in the memory 1102, and the processor 1101 reads instructions in the memory 1102, and completes the steps of the foregoing methods in combination with hardware of the processor 1101.

Optionally, in some embodiments, the memory 1102 may store instructions used to perform the method performed by the network apparatus in the method shown in FIG. 2. The processor 1101 may execute the instructions stored in the memory 1102 and complete, in combination with other hardware (for example, the transceiver 1103), the steps of the network apparatus in the method shown in FIG. 2. For a specific working process and beneficial effects, refer to the descriptions in the embodiment shown in FIG. 2.

Optionally, in some embodiments, the memory 1102 may store instructions used to perform the method performed by the network apparatus in the method shown in FIG. 3. The processor 1101 may execute the instructions stored in the memory 1102 and complete, in combination with other hardware (for example, the transceiver 1103), the steps of the network apparatus in the method shown in FIG. 3. For a specific working process and beneficial effects, refer to the descriptions in the embodiment shown in FIG. 3.

Optionally, in some embodiments, the memory 1102 may store instructions used to perform the method performed by the network apparatus in the method shown in FIG. 7. The processor 1101 may execute the instructions stored in the memory 1102 and complete, in combination with other hardware (for example, the transceiver 1103), the steps of the network apparatus in the method shown in FIG. 7. For a specific working process and beneficial effects, refer to the descriptions in the embodiment shown in FIG. 7.

An embodiment of this application further provides a chip, and the chip includes a transceiver unit and a processing unit. The transceiver unit may be an input/output circuit and/or a communication interface. The processing unit is a processor, a microprocessor, or an integrated circuit integrated on the chip. The chip may perform the method on the terminal apparatus side in the foregoing method embodiments. The input/output circuit is configured to receive a signal or send a signal, the communication interface is configured to read information or data, for example, read a program or instructions in a memory, and the processing unit may invoke the program or the instructions to implement the foregoing method.

An embodiment of this application further provides a chip, and the chip includes a transceiver unit and a processing unit. The transceiver unit may be an input/output circuit and/or a communication interface. The processing unit is a processor, a microprocessor, or an integrated circuit integrated on the chip. The chip may perform the method performed on the network apparatus side in the foregoing embodiments. The input/output circuit is configured to receive a signal or send a signal, the communication interface is configured to read information or data, for example, read a program or instructions in a memory, and the processing unit may invoke the program or the instructions to implement the foregoing method.

An embodiment of this application further provides a computer-readable storage medium. The computer-readable storage medium stores instructions. When the instructions are executed, the method on the terminal apparatus side in the foregoing method embodiments is performed.

In another form of this embodiment, a computer-readable storage medium is provided. The computer-readable storage medium stores instructions. When the instructions are executed, the method on the network apparatus side in the foregoing method embodiments is performed.

An embodiment of this application further provides a computer program product including instructions. When the instructions are executed, the method on the terminal apparatus side in the foregoing method embodiments is performed.

In another form of this embodiment, a computer program product including instructions is provided. When the instructions are executed, the method on the network apparatus side in the foregoing method embodiments is performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
    receiving, by a terminal apparatus, first indication information from a network apparatus, wherein the first indication information is carried on a first physical broadcast channel (PBCH), the first indication information indicates a first frequency domain resource, the first frequency domain resource is used for transmission of first downlink control information, and the first downlink control information is used to schedule first system information; and
    receiving, by the terminal apparatus, target system information and/or target downlink control information from the network apparatus on a target frequency domain resource,
    wherein a bandwidth size of the target frequency domain resource is less than or equal to a bandwidth size supported by the terminal apparatus, and the target downlink control information is used to schedule the target system information, and
    wherein, in response to a bandwidth size of the first frequency domain resource being greater than the bandwidth size supported by the terminal apparatus, the target frequency domain resource is a second frequency domain resource, the second frequency domain resource is different from the first frequency domain resource, and the receiving, by the terminal apparatus, target system information and/or target downlink control information from the network apparatus on the target frequency domain resource comprises:
    receiving, by the terminal apparatus, second system information and/or second downlink control information from the network apparatus on the second frequency domain resource, wherein the second downlink control information is used to schedule the second system information.

2. The method according to claim 1, wherein, in response to the bandwidth size of the first frequency domain resource being less than or equal to the bandwidth size supported by the terminal apparatus, the target frequency domain resource is the first frequency domain resource, and the receiving, by the terminal apparatus, target system information and/or target downlink control information from the network apparatus on a target frequency domain resource comprises:
    receiving, by the terminal apparatus, the first downlink control information and/or the first system information from the network apparatus on the first frequency domain resource.

3. The method according to claim 1, wherein
    the first frequency domain resource is the same as a frequency domain resource of a first initial active downlink bandwidth part BWP; and/or
    the second frequency domain resource is the same as a frequency domain resource of a second initial active downlink BWP.

4. The method according to claim 1, wherein the method further comprises:
    receiving, by the terminal apparatus, second indication information from the network apparatus, wherein the second indication information is carried on a second PBCH, and the second indication information is used to indicate the second frequency domain resource.

5. A communication method, wherein the method comprises:
    sending, by a network apparatus, first indication information, wherein the first indication information is carried on a first physical broadcast channel (PBCH), the first indication information indicates a first frequency domain resource, the first frequency domain resource is used for transmission of first downlink control information, and the first downlink control information is used to schedule first system information;
    sending, by the network apparatus, the first downlink control information on the first frequency domain resource; and
    sending, by the network apparatus, second downlink control information and/or second system information on a second frequency domain resource, wherein the first frequency domain resource is different from the second frequency domain resource,
    wherein a bandwidth size of the first frequency domain resource is greater than a bandwidth size of the second frequency domain resource.

6. The method according to claim 5, wherein
    the first frequency domain resource is the same as a frequency domain resource of a first initial active downlink bandwidth part BWP; and/or
    the second frequency domain resource is the same as a frequency domain resource of a second initial active downlink BWP.

7. The method according to claim 5, wherein the method further comprises:
    sending, by the network apparatus, second indication information, wherein the second indication information is carried on a second PBCH, and the second indication information is used to indicate the second frequency domain resource.

8. The method according to claim 5, wherein
    the second frequency domain resource is predefined or configured; or
    the second frequency domain resource is one of a plurality of frequency domain resources, and the plurality of frequency domain resources are predefined or configured.

9. The method according to claim 7, wherein
the first indication information is indication information of a control resource set for a first physical downlink control channel (PDCCH) common search space set, and the control resource set for the first PDCCH common search space set is used to monitor the first downlink control information; and
the second indication information is indication information of a control resource set for a second PDCCH common search space set, and the control resource set for the second PDCCH common search space set is used to monitor the second downlink control information.

10. A communications apparatus, comprising:
one or more processors, and
a memory having instructions stored thereon that, when executed by the one or more processors, cause the communications apparatus to:
receive first indication information from a network apparatus, wherein the first indication information is carried on a first physical broadcast channel (PBCH), the first indication information indicates a first frequency domain resource, the first frequency domain resource is used for transmission of first downlink control information, and the first downlink control information is used to schedule first system information;
receive target system information and/or target downlink control information from the network apparatus on a target frequency domain resource, wherein a bandwidth of the target frequency domain resource is less than or equal to a bandwidth size supported by the communications apparatus, and the target downlink control information is used to schedule the target system information; and
process the target system information and/or the target downlink control information received,
wherein, in response to bandwidth size of the first frequency domain resource being greater than the bandwidth size supported by the communications apparatus, the target frequency domain resource is a second frequency domain resource, the second frequency domain resource is different from the first frequency domain resource, and the instructions further cause the communications apparatus to:
receive second system information and/or second downlink control information from the network apparatus on the second frequency domain resource, wherein the second downlink control information is used to schedule the second system information.

11. The communications apparatus according to claim 10, wherein, in response to, the bandwidth size of the first frequency domain resource being less than or equal to the bandwidth size supported by the communications apparatus, the target frequency domain resource is the first frequency domain resource, and the instructions further cause the communications apparatus to:
receive, on the first frequency domain resource, the first downlink control information and/or the first system information sent by the network apparatus.

12. The communications apparatus according to claim 10, wherein
the first frequency domain resource is the same as a frequency domain resource of a first initial active downlink bandwidth part (BWP); and/or
the second frequency domain resource is the same as a frequency domain resource of a second initial active downlink BWP.

13. The communications apparatus according to claim 10, wherein the instructions further cause the communications apparatus to:
receive second indication information from the network apparatus, wherein the second indication information is carried on a second PBCH, and the second indication information is used to indicate the second frequency domain resource.

14. A communications apparatus, comprising:
one or more processors, and
a memory having instructions stored thereon that, when executed by the one or more processors, cause the communications apparatus to:
determine first indication information; and
send first indication information, wherein the first indication information is carried on a first physical broadcast channel (PBCH), the first indication information indicates a first frequency domain resource, the first frequency domain resource is used for transmission of first downlink control information, and the first downlink control information is used to schedule first system information;
send the first downlink control information on the first frequency domain resource; and
send second downlink control information and/or second system information on a second frequency domain resource, wherein the first frequency domain resource is different from the second frequency domain resource,
wherein a bandwidth size of the first frequency domain resource is greater than a bandwidth size of the second frequency domain resource.

15. The communications apparatus according to claim 14, wherein
the first frequency domain resource is the same as a frequency domain resource of a first initial active downlink bandwidth part BWP; and/or
the second frequency domain resource is the same as a frequency domain resource of a second initial active downlink BWP.

16. The communications apparatus according to claim 14, wherein the instructions further cause the communications apparatus to: send second indication information, wherein the second indication information is carried on a second PBCH, and the second indication information is used to indicate the second frequency domain resource.

17. The communications apparatus according to claim 14, wherein
the second frequency domain resource is predefined or configured; or
the second frequency domain resource is one of a plurality of frequency domain resources, and the plurality of frequency domain resources are predefined or configured.

18. The communications apparatus according to claim 16, wherein
the first indication information is indication information of a control resource set for a first physical downlink control channel (PDCCH) common search space set, and the control resource set for the first PDCCH common search space set is used to monitor the first downlink control information; and
the second indication information is indication information of a control resource set for a second PDCCH common search space set, and the control resource set for the second PDCCH common search space set is used to monitor the second downlink control information.

19. The method according to claim 1, wherein the second frequency domain resource is predefined or configured; or the second frequency domain resource is one of a plurality of frequency domain resources, and the plurality of frequency domain resources are predefined or configured.

20. The communications apparatus according to claim 10, wherein the second frequency domain resource is predefined or configured; or the second frequency domain resource is one of a plurality of frequency domain resources, and the plurality of frequency domain resources are predefined or configured.

* * * * *